United States Patent
Yoshida et al.

(10) Patent No.: US 10,030,327 B2
(45) Date of Patent: Jul. 24, 2018

(54) ELASTIC KNITTED FABRIC AND CLOTHING ITEM

(71) Applicant: ASAHI KASEI FIBERS CORPORATION, Osaka-shi, Osaka (JP)

(72) Inventors: Yuji Yoshida, Tokyo (JP); Kenji Ooya, Tokyo (JP)

(73) Assignee: ASAHI KASEI FIBERS CORPORATION, Osaka (JP)

( * ) Notice: Subject to any disclaimer, the term of this patent is extended or adjusted under 35 U.S.C. 154(b) by 221 days.

(21) Appl. No.: 14/780,160

(22) PCT Filed: Mar. 28, 2014

(86) PCT No.: PCT/JP2014/059291
§ 371 (c)(1),
(2) Date: Sep. 25, 2015

(87) PCT Pub. No.: WO2014/157667
PCT Pub. Date: Oct. 2, 2014

(65) Prior Publication Data
US 2016/0040328 A1    Feb. 11, 2016

(30) Foreign Application Priority Data

Mar. 29, 2013  (JP) ................. 2013-073157
Mar. 29, 2013  (JP) ................. 2013-073619

(51) Int. Cl.
*D04B 1/18*    (2006.01)
*D04B 21/18*   (2006.01)
(Continued)

(52) U.S. Cl.
CPC ............. *D04B 1/18* (2013.01); *D04B 21/18* (2013.01); *A41B 2500/10* (2013.01); *D04B 1/24* (2013.01); *D04B 21/207* (2013.01); *Y02P 70/633* (2015.11)

(58) Field of Classification Search
CPC ... D04B 1/28; D04B 1/18; D04B 1/24; D04B 21/18; D04B 21/207
See application file for complete search history.

(56) References Cited

U.S. PATENT DOCUMENTS 5,708,118 A * 1/1998 Seneker ................ C08G 18/12
                                                  528/61
5,843,357 A * 12/1998 Seneker ................ C08G 18/12
                                                  264/176.1
(Continued)

FOREIGN PATENT DOCUMENTS

JP    2003-227043    8/2003
JP    2010-18979     9/2010
(Continued)

OTHER PUBLICATIONS

Australian Office Action for corresponding AU Application No. 2014244921 dated Feb. 8, 2015.
(Continued)

*Primary Examiner* — Danny Worrell
(74) *Attorney, Agent, or Firm* — Finnegan, Henderson, Farabow, Garrett, Dunner, LLP

(57) ABSTRACT

An elastic knitted fabric comprising an elastic yarn and a non-elastic yarn, the elastic knitted fabric being characterized in that: the elastic yarn content is 20-60 g/m²; when the knitted fabric is stretched to 80% and then returned to the original length and the forward-movement stress and the return-movement stress at the 50% point during the stretching and contracting are measured, the stress ratio measured using the following relationship: stress ratio=(return-move- (Continued)

ment stress (N) at the 50% point)/(forward-movement stress (N) at the 50% point) is 0.40-0.80; and the instantaneous temperature rise caused by heat generation during stretching in the warp and/or weft direction is at least 1.0° C.

11 Claims, 3 Drawing Sheets

(51) Int. Cl.
    *D04B 21/20* (2006.01)
    *D04B 1/24* (2006.01)

(56) References Cited

U.S. PATENT DOCUMENTS

| | | | | |
|---|---|---|---|---|
| 6,216,497 | B1* | 4/2001 | Miyata | A41B 17/00 66/202 |
| 6,263,707 | B1* | 7/2001 | Miller | D04B 1/18 66/171 |
| 9,689,092 | B2* | 6/2017 | Liao | D04B 1/18 |
| 9,732,452 | B2* | 8/2017 | Yoshida | D04B 21/18 |
| 2006/0030229 | A1* | 2/2006 | Fukuoka | D04B 1/16 442/197 |
| 2008/0066347 | A1* | 3/2008 | Suzuki | A43B 1/00 36/83 |
| 2012/0244773 | A1 | 9/2012 | Akita | |
| 2014/0238084 | A1* | 8/2014 | Yoshida | D04B 21/18 66/174 |
| 2016/0040328 | A1* | 2/2016 | Yoshida | D04B 21/18 66/202 |
| 2016/0265146 | A1* | 9/2016 | Liao | D04B 1/18 |
| 2017/0035605 | A1* | 2/2017 | Estreicher | A61F 7/02 |

FOREIGN PATENT DOCUMENTS

| | | |
|---|---|---|
| JP | 2011-195970 | 10/2011 |
| JP | 2012-112078 | 6/2012 |
| JP | 2013-79466 | 5/2013 |
| JP | 5777721 B | 7/2015 |
| TW | 2011120265 | 6/2011 |

OTHER PUBLICATIONS

European Office Action for corresponding EP Application No. 14 776 190.2 dated Apr. 12, 2016.
Englishe-language Japanese Patent Office Search Report in corresponding JP 2014/059291, dated Jul. 1, 2014.

* cited by examiner

ELASTIC KNITTED FABRIC AND CLOTHING ITEM

TECHNICAL FIELD

The present invention relates to an elastic knitted fabric comprising an elastic yarn that instantaneously rises in temperature when stretched, and a clothing item composed of that knitted fabric.

BACKGROUND ART

Clothing has been produced from fabrics obtained by blending hygroscopic, heat-generating fibers, such as cellulose fibers for use as clothing that undergoes a rise in temperature when worn, and clothing is known that causes heat to be generated by insensible water loss and perspiration from the body when worn (see, for example, Patent Document 1). However, once the amount of moisture absorbed by hygroscopic, heat-generating fibers reaches saturated level, there is no further generation of heat, which not only resulted in a short duration of heat generation, but also even caused the wearer to feel cold due to moisture present in the fibers. Moreover, although clothing incorporating a heater, such as a planar heating element or a linear heating element is also known for use as an exothermic fabric or exothermic cloth other than that employing hygroscopic heat generation, since all of these generate heat by electricity, they are heavy when worn as clothing and require electrodes, thereby making movement difficult.

In addition, a knitted fabric has recently been proposed that has a heat generation function, i.e., completely different from that employed in the past in which heat is generated during stretching of the knitted fabric during a body movement when worn (see, for example, Patent Document 2 and Patent Document 3).

PRIOR ART DOCUMENTS

Patent Documents

Patent Document 1: Japanese Unexamined Patent Publication No. 2003-227043
Patent Document 2: Japanese Unexamined Patent Publication No. 2011-195970
Patent Document 3: Japanese Unexamined Patent Publication No. 2012-112078

DISCLOSURE OF THE INVENTION

Problems to be Solved by the Invention

However, although these knitted fabrics are certainly warm as a result of generating heat when stretched, the knitted fabric is hard and considerable stress is required to stretch the fabric, thereby requiring improvements that enable the realization of fabrics facilitating movement of the body.

Under these circumstances, it is necessary to use a knitted fabric having the novel function of generating heat during stretching to provide a knitted fabric that enables the production of more comfortable clothing.

An object of the present invention is to provide a knitted fabric that continuously generates heat during stretching if the knitted fabric is repeatedly stretched and recovered, enables heat generation during stretching to be achieved efficiently, and can be used to produce clothing facilitating a body movement, and a clothing item that can be expected to prevent injuries and be effective in burning off fat by retaining heat and warming the muscles and joints at locations where the fabric is stretched as a result of knit clothing, such as an innerwear or a sportswear that uses this knitted fabric.

Means for Solving the Problems

As a result of conducting extensive experiments to solve the aforementioned problems, the inventors of the present invention found that the instantaneous temperature rise caused by heat generation during stretching can be made to be 1.0° C. or more by employing the following composition in a knitted fabric composed of a non-elastic yarn and an elastic yarn, thereby leading to completion of the present invention.

Namely, the present invention is as indicated below.

[1] An elastic knitted fabric comprising an elastic yarn and a non-elastic yarn, wherein the content of the elastic yarn is 20 g/m² to 60 g/m², the stress ratio, as determined according to the following equation when the stretching stress and the stress of elastic recovery are measured at 50% elongation during stretching and recovery after having stretched the knitted fabric to 80% elongation followed by returning to its original length, is 0.40 to 0.80, and the instantaneous temperature rise caused by heat generation during stretching in at least the warp or weft direction is 1.0° C. or more.

Stress ratio=(stress of elastic recovery (N) at 50% elongation)/(stretching stress (N) at 50% elongation)

[2] The knitted fabric described in [1] above, wherein the fineness ratio (fineness ratio=(fineness of non-elastic yarn)/(fineness of elastic yarn)) between the elastic yarn and the non-elastic yarn in a stitch pattern that composes the knitted fabric, is 1.0 to 2.5.

[3] The knitted fabric described in [1] or [2] above, wherein the loop ratio (Lb/La) between a length La, obtained by adding the length of a sinker loop of the elastic yarn and the length of a needle loop of the non-elastic yarn in one unit of the stitch pattern when the knitted fabric has been stretched by 30% elongation in both the warp and weft directions, and a length Lb, obtained by adding the length of a sinker loop of the elastic yarn and the length of a needle loop of the non-elastic yarn in one unit of the stitch pattern, when the knitted fabric has been further stretched by 50% elongation in either one of the warp and weft directions, satisfies the expression indicated below.

1.15≤Lb/La≤1.75

[4] The knitted fabric described in any of [1] to [3] above, wherein the heat generation index, determined according to the equation below, using the elongation (%) under a load of 9.8 N when the knitted fabric is stretched and the stress ratio determined according to claim 1, is 40 to 120.

Heat generation index=(elongation (%) under a load of 9.3 N)×(stress ratio)

[5] The knitted fabric described in any of [1] to [4] above, which is a weft knit fabric.

[6] The weft knit fabric described in [5] above, wherein the elastic yarn content is 20 g/m² to 50 g/m².

[7] The weft knit fabric described in [5] or [6] above, wherein tuck loops or welt loops are composed of an elastic yarn and/or at least either of the knit loops before and after the course which are composed by the tuck loops or welt loops, are composed of an elastic yarn, and the tuck loops or welt loops are contained at 20% to 60% of all the loops in the weft knit fabric.

[8] The knitted fabric described in any of [1] to [4] above, which is a warp knit fabric.

[9] The warp knit fabric described in [8] above, wherein the elastic yarn content is 30 g/m² to 60 g/m².

[10] The warp knit fabric described in [8] or [9] above, wherein the loop ratio (Lb/La) between a length La, obtained by adding the length of a sinker loop of the elastic yarn and the length of a needle loop of the non-elastic yarn in one unit of the stitch pattern when the knitted fabric has been stretched by 30% elongation in both the warp and weft directions, and a length Lb, obtained by adding the length of a sinker loop of the elastic yarn and the length of a needle loop of the non-elastic yarn in one unit of the stitch pattern, when the knitted fabric has been further stretched by 50% elongation in either one of the warp and weft directions, satisfies the expression indicated below.

$$1.15 \leq Lb/La \leq 1.65$$

[11] The warp knit fabric described in any of [8] to [10] above, wherein at least the elastic yarn is knitted with open laps.

[12] A clothing item comprising the knitted fabric described in any of [1] to [11] above that attaches closely to the body and at least covers a joint.

[13] The clothing item described in [12] above, wherein the clothing item is selected from the group consisting of bottoms, tops, leg wear, supporters and gloves.

Effects of the Invention

In addition to becoming warm by generating heat that causes the temperature of the knitted fabric to rise by 1.0° C. or more as a result of bending and stretching the knees and arms resulting in superior heat-retaining properties, a clothing item in which the elastic knitted fabric of the present invention is used, is capable of preventing injuries and burning off fat as a result of warming muscles at locations where the fabric is stretched. When exercising while wearing the fabric clothes, in particular, in winter, decrease in muscle temperature can be prevented by generation of heat, decrease in motor function attributable to the decrease in muscle temperature can be prevented, and physical disorder-induced pain, such as knee pain can also be prevented and alleviated.

BEST MODE FOR CARRYING OUT THE INVENTION

Figure 1:
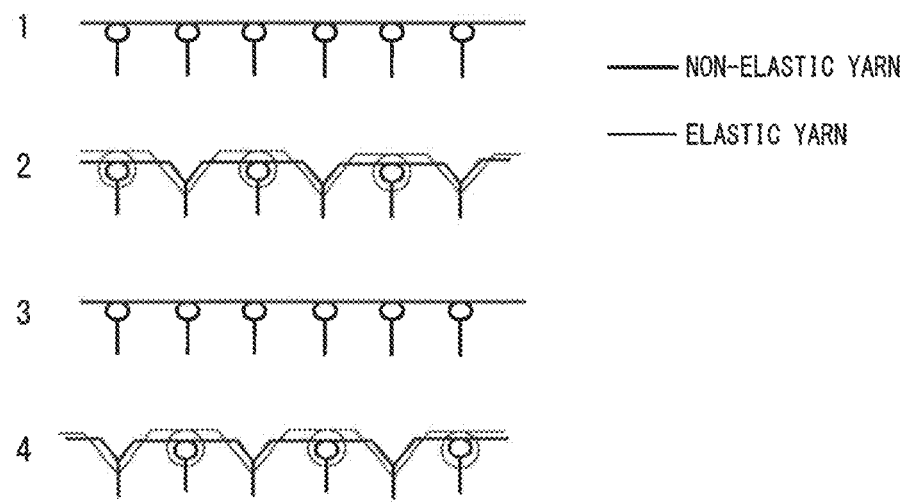
FIG. 1 shows one example of the stitch pattern of an elastic weft knit fabric according to the present invention.

The following provides a detailed explanation of the present invention.

The elastic knitted fabric of the present invention is a weft knit fabric produced by a circular knitting machine or a flat knitting machine, or a warp knit fabric produced by a warp knitting machine, wherein the content of the elastic yarn is 20 g/m² to 60/m², and the stress ratio, as determined according to the following equation when the stretching stress and the stress of elastic recovery are measured at the 50% elongation during stretching and recovery after having stretched the knitted fabric to 80% elongation followed by returning to its original length, is 0.40 to 0.80, and the instantaneous temperature rise caused by heat generation during stretching in at least the warp or weft direction is 1.0° C. or more.

Stress ratio=(stress of elastic recovery (N) at 50% elongation)/(stretching stress (N) at 50% elongation)

The instantaneous temperature rise caused by heat generation in the present invention refers to a value calculated from the difference between the maximum temperature exhibited by the knitted fabric during the time when 100 cycles of repeated stretching and recovery operation, consisting of stretching the knitted fabric by 60% to 100% elongation and then recovering (and returning) to its original length, are carried out, and the temperature of the knitted fabric prior to the start of testing under conditions of not supplying energy from the outside other than that attributable to stretching, and not allowing the temperature caused by heat generation during stretching to be changed by wind.

If the knitted fabric temperature during 100 cycles of stretching and recovery to 60% to 100% elongation or the temperature immediately after completion of stretching and recovery operation is higher than the knitted fabric temperature prior to the start of testing, this indicates that heat is generated instantaneously. The elastic knitted fabric of the present invention is required to demonstrate an instantaneous temperature rise caused by heat generation during stretching as measured according to this method of 1.0° C. or more. If the temperature rise caused by heat generation during stretching is less than 1.0° C., the generation of heat can hardly be felt at all. The temperature rise caused by heat generation during stretching is preferably 1.5° C. or more and more preferably 2.0° C. or more. Although the temperature rise is preferably the higher the better, and there are no particular limitations on the upper limit thereof provided, there is no detrimental effect on the body. Since the modulus of the knitted fabric becomes high, which makes difficult to move when used as clothing if the content of elastic yarn becomes excessively high as a result of attempting to further increase the temperature rise caused by heat generation during stretching, the temperature rise is preferably 10° C. or less. In addition, the temperature rise caused by heat generation during stretching is only required to be 1.0° C. or more when the knitted fabric is stretched 60% to 100% elongation in at least one of the warp and weft directions. And in the case of a knitted fabric in which the temperature rise caused by heat generation during stretching is 1.0° C. or more in both the warp direction and weft direction of the knitted fabric, although no particular considerations are required to be given to a pattern layout during sewing of the finished product. Furthermore, in the case of a knitted fabric in which the temperature rise caused by heat generation during stretching in one direction only, aligning the direction in which the skin stretches over joints of the human body by a large elongation, in particular, with the direction of the knitted fabric for which instantaneous heat generation is large makes it possible to produce clothing that is warm during body movement.

The elongation of a knitted fabric when measuring temperature rise, is set according to the elongation of a knitted fabric having an initial length of 10.0 cm and width of 2.5 cm under a load of 9.8 N. The elongation in the case knitted fabric elongation is 100% or more is equivalent to be 100%, and the elongation in the case knitted fabric elongation is 60% to less than 100% elongation is the elongation that is 0.9 times the elongation under a load of 9.8 N. For example, the elongation of a knitted fabric under a load of 9.8 N is 80% elongation is set to 80%×0.9=72%. It is necessary to design the knitted fabric so that the knitted fabric elongation in either the warp direction or weft direction under a load of 9.8 N is 60% elongation or more, and in the case the elongation in both the warp direction and weft direction is less than 60% elongation, the knitted fabric feels excessively tight when worn as clothing, and can be said to be unsuitable for use in clothing that adheres tightly to the skin.

Methods used to measure the knitted fabric elongation under a load of 9.8 N and the temperature rise are subsequently explained in detail in the examples.

A conventional knitted fabric comprising an elastic yarn gives elasticity to the knitted fabric and imparts a comfortable fit when worn as clothing, and as a result thereof, allows the obtaining of clothing that creates a slim appearance or improves motor function. In contrast, the present invention allows the obtaining of a knitted fabric that generates heat as a result of stretching, and is based on a completely different concept than the conventional knitted fabric. In order to make the instantaneous temperature rise caused by heat generation when stretched to 60% to 100% elongation to be 1.0° C. or more, it is important that the elastic yarn content, the fineness ratio between an elastic yarn and a non-elastic yarn, number of loops and the stress ratio of the knitted fabric and etc. are within the proper ranges, or in other words, it is important to employ a knitted fabric design having the proper yarn usage, the loop pattern and etc. and a knitted fabric production method that includes a processing method for efficiently demonstrating heat generation during stretching. According to the present invention, the elastic knitted fabric has been provided for the first time that demonstrates a temperature rise caused by heat generation when stretched to 60% to 100% elongation of 1.0° C. or more, generates considerable heat even when only slightly stretched by 30% to 50% elongation equivalent to the elongation of a joint of the human body when worn, and allows the generation of heat to be actually perceived when worn.

In the elastic knitted fabric of the present invention, the elastic yarn content thereof is important since the elastic yarn greatly contributes to heat generation during stretching in order to make the temperature rise caused by heat generation when stretched to 60% to 100% elongation to be 1.0° C. or more, and it is therefore necessary that the elastic yarn be contained in the knitted fabric at 20 g/m$^2$ to 60 g/m$^2$. Since the temperature rise caused by heat generation during stretching becomes larger as the elastic yarn content increases, the elastic yarn content in the knitted fabric is preferably 25 g/m$^2$ to 55 g/m$^2$. If the elastic yarn content is excessively low, the temperature rise is small, while if the elastic yarn content is excessively high, the weight of the knitted fabric increases and the modulus of the knitted fabric becomes high. Since this results in difficulty in moving when used as clothing, the elastic yarn content is made to be 20 g/m$^2$ to 60 g/m$^2$.

As a result of conducting studies on the elastic knitted fabric of the present invention with respect to a knitted fabric design that allows heat to be generated during stretching with as low an elastic yarn content as possible in order to facilitate greater ease of a body movement when worn as clothing, the inventors of the present invention determined the stress ratio of the knitted fabric and found a means for achieving that prescribed stress ratio.

For example, in a perfect elastic yarn, in which heat is generated when the elastic yarn is stretched and heat is absorbed when stretching is relaxed, namely the elastic yarn in which there is perfect overlapping of an stress-strain (elongation) curve (S-S curve) during stretching, the heat generated during stretching and the heat absorbed when recovering (stretching is relaxed) are nearly equal, or in other words, the amount of heat generated for the entire cycle of stretching and recovering is nearly zero. In the present invention, a knitted fabric stress ratio is defined in order to minimize heat absorption during relaxation of stretching with respect to a rise in temperature caused by heat generation when the knitted fabric is stretched, and a means was found for attaining a prescribed range for this stress ratio.

The stress ratio is subject to optimum conditions, namely it is extremely important that the stress ratio during stretching be 0.40 to 0.80. Although the stress ratio of an ordinary knitted fabric exceeds 0.80, if the stress ratio is greater than 0.80, a phenomenon occurs whereby heat is absorbed during relaxation of stretching even if heat is generated during stretching, thereby resulting in a greater likelihood of a decrease in heat generation. In addition, in the case the stress ratio is less than 0.40, although heat generation during stretching becomes high, the knitted fabric ends up deforming causing clothing to lose its shape after bending and stretching of a joint of the elbow or knee when worn as clothing, thereby making this undesirable. While in the case the stress ratio is excessively high, the temperature rise caused by heat generation during stretching per se becomes low. Thus, the stress ratio is preferably 0.45 to 0.75 and more preferably 0.45 to 0.70. The stress ratio can be controlled according to the elastic yarn content, the stress ratio of the elastic yarn per se (stress performance at stretching of 50% during stretching and recovery of the elastic yarn), the fineness ratio between an elastic yarn and a non-elastic yarn, and slippage of the knitted fabric. As the stress ratio becomes smaller the greater is the fineness ratio between an elastic yarn and a non-elastic yarn, the stress ratio can be controlled with a method by which a knitted fabric is produced, using an elastic yarn having a stress ratio that is smaller than a typical elastic yarn or employing more severe heating conditions of heat setting (particularly effective) during dyeing and finishing of the knitted fabric. Heat setting at a temperature of 190° C. to 195° C. that is slightly higher than the ordinary setting temperature is preferable, while in the case of being unable to raise to the setting temperature, setting time is made to be longer than the ordinary setting time, and is preferably made to be, for example, about 70 seconds to 90 seconds. Moreover, the stress ratio decreases easily if the knitted fabric is finished so as to be non-slipping. In terms of specific examples of finishing agents used, a silicon-based smoothing agent is preferably not used, and for example, the stress ratio is easily contained within the prescribed range by finishing with a polyester-based finishing agent or without using a finishing agent. Furthermore, the stress ratio is determined while rounding to the third decimal place according to the following equation by determining the stretching stress and the stress of elastic recovery at the 50% elongation during stretching and recovery operation after having stretched the knitted fabric to 80% elongation, followed by returning to its original length.

Stress ratio=(stress of elastic recovery (N) at 50% elongation)/(stretching stress (N) at 50% elongation)

Furthermore, although the stress ratio is determined based on the stress at an intermediate elongation during stretching and recovery after stretching the knitted fabric to 80% elongation, in the case the elongation of the knitted fabric is low and it is difficult to stretch the knitted fabric to 80% elongation, the stress ratio is determined from the stretching stress and the stress of elastic recovery at 50% elongation during stretching and recovery after having stretched the knitted fabric to 60% elongation, followed by returning to its original length.

Furthermore, it was found that determining the stress ratio from the stretching stress at the 50% elongation and the stress of elastic recovery at 50% elongation facilitates determination of the degree to which the temperature rise (caused by heat generation during stretching of the knitted fabric) absorbs heat when recovering from stretching, and since the temperature at which heat is absorbed becomes lower as the stress ratio becomes smaller, a nigh temperature rise caused by heat generation is obtained during stretching.

It is also important that the elastic yarn of the elastic knitted fabric of the present invention be stretched efficiently by a body movement when wearing the fabric as clothing. Namely, in a conventional knitted fabric comprising an elastic yarn, the elastic yarn winds and bends through the knitted fabric, and when the fabric is stretched, the wound and bent portions are first stretched, causing the elastic yarn to become straight. Moreover, since needle loops and sinker loops of the yarn in the fabric shift out of position at the intersecting portions thereof, the needle loops or the sinker loops become smaller in the direction of stretching, namely winding and bending portions of the elastic yarn become straight or loops become deformed preferential to the total amount of change in the lengths of the needle loops and sinker loops. Since the elastic yarn is stretched by following these changes, the stitch pattern where the elastic yarn is knit has extremely poor efficiency for obtaining generation of heat during stretching as required by the present invention.

In contrast, in the elastic knitted fabric of the present invention, there is extremely little winding and bending of elastic yarn in the knitted fabric and stretching of the fabric causes the elastic yarn to be stretched efficiently, and as a result thereof, the knitted fabric generates a large amount of heat when stretched. These structural differences between a conventional knitted fabric and the elastic knitted fabric of the present invention can be made clearer with the method indicated below.

A length obtained by adding the length of a sinker loop of the elastic yarn and the length of a needle loop of the non-elastic yarn in one unit of the knitted pattern when the knitted fabric has been stretched by 30% elongation in either one of the warp and weft directions and stretched by an elongation of 0% in the other direction is defined as La. Moreover, a length obtained by adding the length of a sinker loop of the elastic yarn and the length of a needle loop of the non-elastic yarn in one unit of the knitted pattern in the case of having further stretched the knitted fabric by 50% elongation in the same direction as when measuring La is defined as Lb. The expression $1.15 \leq Lb/La \leq 1.75$ is preferably satisfied in order to obtain a knitted fabric that demonstrates a large amount of heat generation when stretched. The value of Lb/La can be made to be within this range by adjusting the knitted patterns and the conditions in the dyeing processing step. If Lb/La is within this range, the knitted fabric generates heat when stretched without impairing the feel when worn. Furthermore, if Lb/La is less than 1.15, the elongation (%) of elastic yarn in the knitted fabric becomes low, and as a result thereof, is so low as to prevent perception of a temperature rise caused by heat generation during stretching. Moreover, due to poor stretching and recovery of the elastic yarn, the stretched knitted fabric does not return to its original form and is susceptible to the occurrence of undulation and deformation of the fabric shape. In addition, if the value of Lb/La exceeds 1.75, the modulus of the elastic yarn becomes excessively high, thereby not only resulting in clothing that is difficult to wear and difficult to move, but also, as a result of considerable deformation of the knitted fabric and deformation of both the elastic yarn and the non-elastic yarn being excessively large, the elastic recovery is inadequate, thereby causing the knitted fabric to undergo undulation when stretching is relaxed or dimensional changes during laundering that lead to deformation of shape. Thus, La and Lb preferably satisfy the expression $1.15 \leq Lb/La \leq 1.75$ and more preferably satisfy the expression $1.20 \leq Lb/La \leq 1.70$. As a result, in addition to generating heat as a result of stretching, clothing can be obtained that does not lose its shape when worn or laundered.

Furthermore, although the knitted fabric is further stretched by 50% elongation in order to measure Lb after having measured La by stretching the knitted fabric by 30% elongation, in the case the elongation of the knitted fabric is low and it is difficult to stretch, Lb may be measured by stretching a knitted fabric having an initial length of 10.0 cm and width of 2.5 cm to the elongation under a load of 22.05 N.

In the present invention, La and Lb are determined from the length of sinker loops of the elastic yarn and the length of needle loops of the non-elastic yarn in one unit of the knitted pattern as measured according to the method described below using an enlarged image obtained by photographing the knitted fabric from the needle loop side ("technical face"). Here, although the length of the elastic yarn is also inherently preferably measured for the needle loops as well, since needle loops of the elastic yarn are frequently covered by a non-elastic yarn, it is difficult to accurately measure the loop length. Thus, locations are selected where the presence of needle loops of the elastic yarn can be confirmed to be concealed beneath the needle loops of a non-elastic yarn, the length of the needle loop of the non-elastic yarn that demonstrates nearly the same movement as the elastic yarn during stretching is measured, and this value is used in place of the change in length of a needle loop of elastic yarn caused by stretching the knitted fabric. Naturally, those locations where the needle loops of the elastic yarn are not present beneath the non-elastic yarn are not selected as locations where enlarged images are photographed.

As a result of conducting studies on the elastic knitted fabric of the present invention with respect to a knitted fabric design that allows heat to be generated during stretching with as low an elastic yarn content as possible in order to facilitate greater ease of movement when worn as clothing, the inventors of the present invention found that the fineness ratio between the elastic yarn and the non-elastic yarn is important. Namely, even if the elastic yarn content is low, the temperature rise caused by heat generation during stretching can be large depending on the manner in which the elastic yarn is combined with the non-elastic yarn. While conversely, even if the elastic yarn content is high, there are combinations for which the temperature rise caused by heat generation during stretching is high and the knitted fabric stress is not excessively large. It depends on the manner in which the elastic yarn is combined with the non-elastic yarn, thus making the manner in which the elastic yarn and non-elastic yarn are used important. By making the fineness ratio of the elastic yarn that composes the stitch pattern of the finished knitted fabric and the fineness ratio of the non-elastic yarn that composes the stitch pattern of the knitted fabric following dyeing and finishing treatment to be 1.0 to 2.5, it is possible to preferably generate heat during stretching, while if the fineness ratio is less than 1.0, the modulus of the knitted fabric becomes high, which makes difficult to move when worn as clothing, and in the case the fineness ratio exceeds 2.5, the texture becomes hard, which in addition to resulting in clothing that is difficult to move, also prevents an adequate temperature rise caused by heat generation during stretching.

It was also newly found that the generation of heat during stretching of the elastic knitted fabric of the present invention is characterized by the relationship with a heat generation index determined from an elongation (%) of the knitted fabric under a fixed load and the stress ratio according to the present invention.

Namely, in the knitted fabric according to the present invention, in the case that a knitted fabric having low elongation has small loops that compose the knitted fabric due to the high density of the knitted fabric or the fabric has been finished to have a coarse density due to dyeing processing of the knitted fabric, since the elastic yarn is effectively stretched easily in either case when the knitted fabric is stretched, the temperature rise caused by heat generation during stretching is large even if the stress ratio is high. Conversely, in the case that the elongation of the knitted fabric is high, since the elongation of the elastic yarn becomes small when stretching the fabric in the case the loops that compose the knitted fabric are large or the knitted fabric is finished to have a high density during a dyeing processing of the knitted fabric, the temperature rise caused by heat generation during stretching tends to be large in the case of making the stress ratio as low as possible. Consequently, in order to effectively generate heat during stretching, the heat generation index determined from the product of elongation under a load of 9.8 N and the stress ratio as indicated in the following equation:

Heat generation index=(elongation (%) under load of 9.8 N)×(stress ratio)

is preferably within a fixed range, or in other words, heat is efficiently generated during stretching if the heat generation index is preferably 40 to 120 and more preferably 50 to 110. Furthermore, the method used to determine the elongation of the knitted fabric is described in detail in the examples.

In the elastic knitted fabric according to the present invention, although the fineness ratio between the elastic yarn and the non-elastic yarn is 1.0 to 2.5, since the fineness ratio of an ordinary knitted fabric is about 2.8 to 5.0, the elastic knitted fabric of the present invention is characterized by the fineness of the elastic yarn being large in comparison with the fineness of the non-elastic yarn, and in the case of finishing the knitted fabric by knitting in an ordinary manner, the texture may be hard and the knitted fabric stress may be excessively high. Therefore, in the case of producing the elastic knitted fabric of the present invention, it is important to form the fabric so that the elastic yarn stretches more than normal and the apparent thickness of the elastic yarn in the knitted fabric is low.

Moreover, the knitted fabric is also preferably finished during dyeing processing so as to be stretched slightly more than normal, and as a general indicator thereof, is finished at nearly the same density as that of the gray fabric. As a result, the elastic yarn content decreases slightly because the elastic yarn remains stretched in the knitted fabric. When a comparison is made between the fineness of the elastic raw yarn and the fineness of elastic yarn after dyeing of an ordinary fabric, the elastic yarn following dyeing processing has the same fineness as that of a raw yarn or being several percent finer. In the elastic knitted fabric of the present invention, when comparing the fineness of elastic raw yarn and the fineness following dyeing processing, is about 10% to 20% finer after dyeing processing, and knitted fabric stress can be lowered with only a small decrease in temperature rise caused by heat generation during stretching. Moreover, it is important during dyeing processing to use more severe heat treatment conditions during heat setting, such as by increasing the setting temperature or increasing setting time to set the knitted fabric while stretched and make the elastic yarn in the knitted fabric to be as fine as possible. In addition, as a general indicator for stretching and setting the knitted fabric, the elongation of a knitted fabric sampled at an initial length of 10.0 cm and width of 2.5 cm under a load of 9.8 N is preferably set to a maximum of within 180%.

The yarn fineness ratio according to the present invention is determined based on the ratio of cross-sectional area between the elastic yarn and the non-elastic yarn. The cross-sectional area is determined by observing cross-sections of the non-elastic yarn and the elastic yarn in the stitch pattern that composes the knitted fabric to be measured, and using the sum of the number of filaments in the case of a multifilament yarn or using values separately determined for each non-elastic yarn and elastic yarn as fineness for each cross-sectional area. At this time, since there are various types of yarn cross-sections, such as a circular, oval, W-shaped, triangular or L-shaped cross-section, and there are many cases in which it is not possible to measure the cross-section by only observing with an electron microscope and etc., in order to determine cross-sectional area easily, the cross-section is enlarged and printed on a nearly uniform paper having a known surface area and weight when observing the cross-section of the yarn. The paper is cut out in the shape of the cross-section after printing, the weight of paper is measured after cutting it out, and the cross-sectional area can then be determined based on the ratio with the weight of the paper before cutting and the magnification factor. In this case, the fineness ratio is easily determined by observing the elastic yarn and the non-elastic yarn at the same magnification factor, printing out the cross-sections onto the paper, cutting out the cross-sections and comparing the cross-sectional areas of the elastic yarn and the non-elastic yarn. In addition, similarly in the case of a spun yarn as well, cross-sections are cut out for each fiber after printing out cross-sections onto paper, and the sum of the number of fibers (number of single yarns) in the cutout cross-sections is taken to be the cross-sectional area. Cross-sectional area is measured at the locations of needle loops and sinker loops, measurements are made using different loops, and the average determined from the cross-sections at 10 locations of needle loops and sinker loops are used as the cross-sectional area and the fineness ratio, respectively. Furthermore, even though the needle loop portions and the sinker loop portions may be from the same loops, there are cases in which loops may be present that have different shapes due to having been stretched or deformed and etc., and in such cases, the site having the most common shape in the knitted fabric is measured followed by determination of fineness ratio according to the equation indicated below.

Fineness ratio=(cross-sectional area of non-elastic yarn)/(cross-sectional area of elastic yarn)

In addition, fineness ratio is determined according to the following equation in the case cross-sections are printed out onto the paper followed by cutting out those cross-sections.

Fineness ratio=(weight of paper from which cross-section of non-elastic yarn was cut out)/(weight of paper from which cross-section of elastic yarn was cut out)

The elastic knitted fabric of the present invention may also constitute a partial mixture of dotted, linear or curved portions where modulus of the fabric varies by changing the stitch pattern or yarn usage or by carrying out resin printed patterning and etc. In this case, at least a portion of the knitted fabric satisfies the aforementioned performance. For example, a knitted fabric that generates a large amount of heat during stretching may be arranged only at a portion of the body, such as the knee where the effect of generating heat during stretching is desired, or a knitted fabric exhibiting low elongation and having a high modulus can be arranged around the knee and etc., and in this case, a product can be realized that is used for the purpose of warming the knee when it is moved and protecting the knee joint with a portion exhibiting low elongation.

The elastic yarn used in the elastic knitted fabric of the present invention can be a polyurethane- or polyether ester-based elastic yarn, a dry-spun or melt-spun elastic yarn can be used as polyurethane-based elastic yarn, and there are no particular limitations on the polyurethane-based elastic yarn. The tensile elongation of the elastic yarn is about 400% to 1000%, the elastic yarn has superior elasticity, and preferably elasticity is kept in the vicinity of the ordinary treatment temperature of 180° C. in the presetting step during dyeing processing. In addition, elastic yarn that has been imparted with functions, such as high setting performance, antimicrobial activity, moisture absorption or water absorption by adding a special polymer or powder can also be used for the elastic yarn. With respect to the fineness of the elastic yarn, fibers of about 20 dtex to 110 dtex can be used, and elastic fibers of about 30 dtex to 80 dtex that facilitate production of knitted fabric and demonstrate a high temperature rise caused by heat generation during stretching are used preferably. In addition, a covering yarn in which a non-elastic yarn has been covered around an elastic yarn, twisted yarn, or blended yarn obtained by blending a non-elastic yarn and an elastic yarn by jetting air thereof, can also be used.

The elastic knitted fabric of the present invention can further contain an inorganic substance in the elastic yarn, a knitted fabric can be obtained that additionally demonstrates the performance of the inorganic substance contained therein, and for example, if titanium oxide is contained, heat-retaining properties can be imparted by far-infrared effects by storing heat generated by the knitted fabric in the titanium oxide. Spinning the organic yarn by incorporating an inorganic substance in the spinning dope is the easiest method for containing an inorganic substance. An inorganic substance as referred to in the present invention refers to a single inorganic substance and/or an inorganic compound, such as titanium oxide or other ceramics, carbon or carbon black, and is preferably in the form of a fine powder so as not to impair spinning of the elastic yarn. These inorganic substances are preferably contained at 1% by weight to 10% by weight in the elastic yarn, and as a result of containing an inorganic substance, heat-retaining effects during generation heat by the knitted fabric can be demonstrated more effectively. Furthermore, since heat-retaining effects may be diminished if the amount of the inorganic substance is low or breakage of the filaments may occur during spinning or during stretching if the amount contained is excessively high, an inorganic substance is preferably contained at 1% by weight to 10% by weight and more preferably contained at 2% by weight to 5% by weight.

Although examples of the elastic yarn used in the elastic knitted fabric of the present invention include the polyurethane-based elastic yarn and polyether ester-based elastic yarn, a method that increases the molecular weight of the elastic yarn is used to increase the temperature rise caused by heat generation during stretching. The use of elastic yarn having a decreased stress ratio is preferable as another method used to increase the temperature rise caused by heat generation during stretching, and examples thereof include spinning by adding a urethane-urea compound having an average of 4 to 40 urea bond units per molecule obtained by reacting a nitrogen-containing compound containing at least one type of raw materials selected from a monofunctional amine in the form of either a primary amine or secondary amine, a hydroxyl group, a tertiary nitrogen and a heterocyclic nitrogen with an organic diisocyanate as indicated in Japanese Unexamined Patent Publication No. 2001-140127; a urea compound obtained by reacting at least one type of a bifunctional amino group among primary amines and secondary amines, a nitrogen-containing compound containing a nitrogen-containing group selected from at least one type of raw materials consisting of tertiary nitrogen and heterocyclic nitrogen, and at least one type of compound selected from an organic diisocyanate, mono- or dialkyl monoamine, alkyl monoalcohol and organic monoisocyanate as indicated in Japanese Patent No. 4343446; a terminal hydroxyl group structure in the form of a polyurethane obtained by reacting a mixture of a polyacrylonitrile-based polymer, a low molecular weight diol and a polymer diol with an organic diisocyanate as indicated in Japanese Unexamined Patent Publication No. H7-316922; or, a styrene-maleic anhydride copolymer. Examples of the aforementioned terminal hydroxyl group structure in the form of a polyurethane include the reaction products of a mixture of a linear or branched alkylene group having 2 to 10 carbon atoms or a low molecular weight diol having hydroxyl groups on both ends of a divalent alicyclic hydrocarbon and a high molecular weight diol having a number average molecular weight of 400 to 3000, with an organic diisocyanate, and is preferably a polyurethane polymer having hydroxyl groups on both ends and a number average molecular weight of 10000 to 40000 in which the urethane group concentration thereof is 3 milliequivalents/g. Although these may be added to the elastic yarn either alone or as a mixture of two or more types, if the added amount is excessively low, the effect of generating heat during stretching is diminished, while conversely if the added amount is excessively high, elastic recovery of the knitted fabric decreases, and since this results in increased susceptibility to the occurrence of deformation of shape as a result of wearing or laundering, the added amount is 2.0% to 15.0% and preferably 2.5% to 8.0% based on the weight of the elastic yarn.

Examples of the non-elastic yarn used in the present invention include polyester-based fibers, such as polyethylene terephthalate or polytrimethylene terephthalate fibers, polyamide-based fibers, polyolefin-based fibers, such as polypropylene fibers, cellulose-based fibers, such as cupra, rayon, cotton or bamboo fibers and animal hair fibers, such as wool, and all types of fibers can be used. In addition, bright, semi-dull or full-dull yarns thereof can be used arbitrarily, and with respect to the shape of the fiber cross-section as well, fibers of any cross-sectional shape, such as a circular, oval, W-shaped, cocoon-shaped or hollow shape can be used, there are no particular limitations on the form of the fibers, a raw yarn or a crimped yarn, such as false-twist yarn can be used, and a non-elastic yarn having a thickness of 20 dt to 110 dt and preferably 30 dt to 90 dt is used preferably. Moreover, the non-elastic yarn may consist of long fibers or a spun yarn, and a compound yarn obtained by blending two or more types of fibers by twisting, covering or air blending and etc. can also be used. Moreover, instead of blending the fibers per se, two or more types of fibers can naturally be blended on a knitting machine.

The non-elastic yarn used in the present invention preferably contains 0.3% by weight to 5% by weight of an inorganic substance particularly in the case of polyester-based fibers, polyamide-based fibers or cellulose-based fibers. The containing of an inorganic substance makes it possible to more effectively demonstrate heat-retaining effects during heat generation by the elastic knitted fabric. Furthermore, since heat-retaining effects are diminished if the amount of inorganic substance is low, while breakage of filaments (yarn) may occur during spinning and stretching if the amount is excessively high, an inorganic substance is more preferably contained at 0.5% by weight to 5% by weight and even more preferably contained at 0.4% by weight to 3% by weight.

In the elastic knitted fabric of the present invention, if a hygroscopic material that absorbs moisture and generates heat, such as cellulose is used for the non-elastic yarn, neat is generated as a result of absorbing moisture when worn and heat is also generated by movement, thereby making it possible to further enhance the effects of the present invention. Moreover, heat-retaining effects can also be enhanced by making it difficult for generated heat to escape by using spun fibers or by raising the fibers.

The knitted fabric of the present invention includes weft knit fabric and warp knit fabric, and in the following detailed explanation of the present invention, the characteristics of each knitted fabric are explained separately for weft knit fabric and warp knit fabric while excluding those portions that overlap with the detailed explanation thus far.

[Weft Knit Fabric]

The weft knit fabric according to the elastic knitted fabric of the present invention, or in other words, the elastic weft knit fabric (hereinafter to be explained using the same expression) is a weft knit fabric comprising a non-elastic yarn and an elastic yarn that is produced with a large-aperture single knit circular knitting machine or double knit circular knitting machine having a cylinder diameter of about 30 inches to 40 inches, a hosiery knitting machine having a cylinder diameter of about 4 inches, a small size knitting machine having a cylinder diameter of 13 inches to 17 inches or a circular knitting machine having 26- to 40-gauge or a high-gauge flat knitting machine, the content of the elastic yarn is 20 g/m$^2$ to 50 g/m$^2$, the stress ratio, determined from the stretching stress and the stress of elastic recovery at the 50% elongation during stretching and recovery after having stretched the weft knit fabric to 80% elongation, followed by returning to its original length, is 0.40 to 0.80, and the instantaneous temperature rise caused by heat generation during stretching in at least one of the warp and weft directions is 1.0° C. or more.

In the elastic weft knit fabric of the present invention, the elastic yarn content thereof is important since the elastic yarn greatly contributes to heat generation during stretching in order to make the instantaneous temperature rise caused by heat generation when stretched to 60% to 100% elongation to be 1.0° C. or more, and it is therefore necessary that the elastic yarn be contained in the knitted fabric at 20 g/m$^2$ to 50 g/m$^2$. Since the temperature rise caused by heat generation becomes larger as the elastic yarn content increases, the elastic yarn content in the knitted fabric is preferably 25 g/m$^2$ to 45 g/m$^2$. If the elastic yarn content is excessively low, the temperature rise caused by heat generation during stretching is small, while if the elastic yarn content is excessively high, the weight of the knitted fabric increases and the modulus of the knitted fabric becomes high, and since this results in difficulty in moving when used as clothing, the elastic yarn content is made to be 20 g/m$^2$ to 50 g/m$^2$.

It is important that the elastic yarn in the elastic weft knit fabric of the present invention be stretched efficiently by a body movement when worn as clothing. Namely, the elastic yarn stretches efficiently as a result of the loop ratio (Lb/La) according to the present invention preferably satisfying the expression $1.15 \leq Lb/La \leq 3.75$, and more preferably by satisfying the expression $1.20 \leq Lb/La \leq 1.70$.

Figure 4:
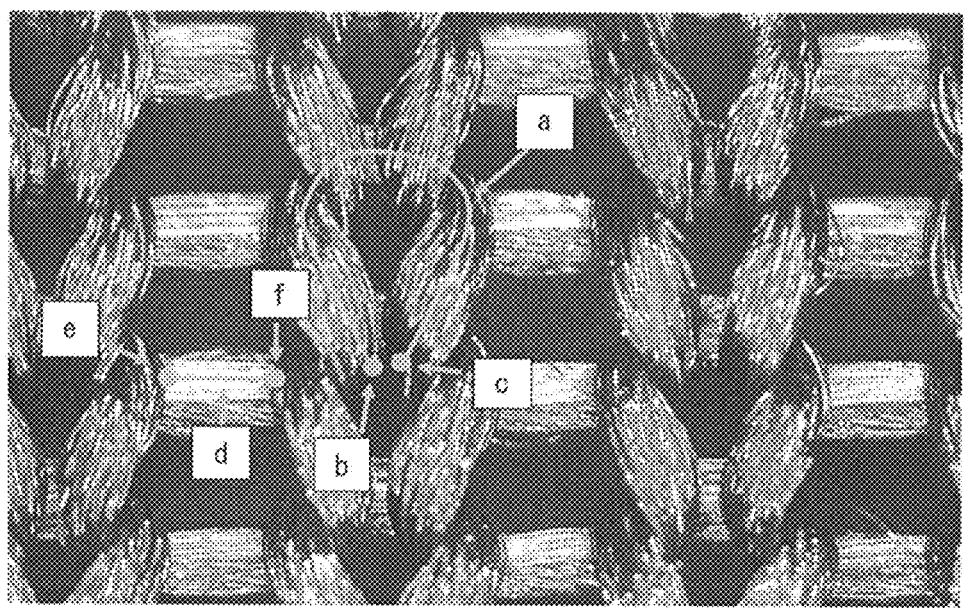
FIG. 4 is a drawing for explaining a method used to measure the length of a needle loop of a non-elastic yarn and the length of a sinker loop of an elastic yarn in an elastic weft knit fabric according to the present invention.

An explanation is provided of the method used to measure each loop length of La and Lb in the elastic weft knitted fabric of the present invention with reference to FIG. 4. The knitted fabric is stretched by 30% in both the warp and weft directions followed by magnifying and observing the needle loop side of the knitted fabric while being in the state. As shown in FIG. 4, the two lowermost portions of a needle loop able to be observed on both sides of the lower portion of a needle loop of the non-elastic yarn were respectively designated as endpoint b and endpoint c, the loop length extending from endpoint b to endpoint c was measured, and that length was used as the length of a needle loop (a) of the non-elastic yarn. With respect to sinker loops, as shown in FIG. 4, both ends of elastic yarn between two needle loops observed between two wales were designated as endpoint e and endpoint f, the length between them was measured, and that length was used as the length of a sinker loop (d) of the elastic yarn.

In the case an elastic yarn is covered by a non-elastic yarn, such as in the case of using a covering yarn, the length of the elastic yarn is measured by estimating those sites where the elastic yarn is present. In this case, the elastic yarn is measured by assuming that the elastic yarn of those portions covered with the non-elastic yarn is present in linear form. In addition, in the case sinker loops are straddling two or more wales as a result of the elastic yarn employing a welt pattern, sinker loops at those portions covered by needle loops present at an intermediate location in the sinker loops are not measured, but rather only the lengths of sinker loops observed from the surface are measured, and the sum of the sinker loop length of each wale is used for the sinker loop (d) length.

The length of the central portion of fiber bundles in the direction of width is measured for both an elastic and a non-elastic yarn. Following completion of each measurement, the length of sinker loops (d) of the elastic yarn is added to the length of needle loops (a) of the non-elastic yarn and the total length of loops in one unit of the stitch pattern is determined and designated as La. Next, the knitted fabric is stretched by 50% elongation in the warp direction or the weft direction, and the total length of loops in one unit of the stitch pattern is similarly determined and designated as Lb. This measurement is then carried out in both the warp direction and the weft direction and the expression $1.15 \leq Lb/La \leq 1.75$ is satisfied in either of the warp direction or the weft direction. Furthermore, in the case of knitted fabric that can only be stretched in one direction, the knitted fabric is measured only in the direction in which the fabric is able to be stretched and that result is used for the loop length.

Furthermore, although the knitted fabric is further stretched in one of either the warp or weft direction when measuring Lb and the elongation at this time is basically 50% elongation, in the case the elongation of the knitted fabric is low and it is difficult to stretch, a sample of the knitted fabric having an initial length of 10.0 cm and width of 2.5 cm is taken and Lb is measured by stretching that knitted fabric under a load of 22.05 N.

In measuring La and Lb, the length of each loop is measured by the order of micron (μm), the length is determined to at least the third decimal place, and 10 arbitrary locations are measured followed by determining the average length. Lb/La is then calculated based on this average length and the result is rounded to the third decimal place.

In addition, a single unit of the stitch pattern refers to a single unit that is repeated in a pattern consisting of a needle loop and a sinker loop, and in the case of, for example, repeated knit and tuck stitches in the wale direction for each wale, the sum of a single knit loop and a single tuck loop constitutes a single unit of the needle loop, and the length resulting from adding two sinker loops thereto becomes La or Lb. Furthermore, in the case the stitch pattern is a welt stitch, the width of needle loops formed by the non-elastic yarn is taken to be the needle loop length in the welt stitch.

In addition, in the case of stretching by 50% elongation in the warp direction, mainly the needle loops are stretched while there is little stretching of sinker loops. On the other hand, in the case of having stretched by 50% elongation in the weft direction, mainly the sinker loops are stretched while there is typically hardly any stretching of needle loops. Thus, needle loops greatly contribute to generation of heat during stretching when stretched in the warp direction, while conversely sinker loops greatly contribute to generation of heat during stretching when stretched in the weft direction. In the case of extracting only the amount of change in needle loops when measuring La and Lb while focusing only on each of these loops, the amount of change in the needle loops during stretching by 50% elongation in the warp direction is preferably 1.1 to 1.7 times in comparison with that before stretching, while the amount of change in the sinker loops during stretching by 50% elongation in the weft direction is preferably 1.8 to 4.0 times in comparison with that before stretching. Furthermore, in this case, although the reason for the amount of change being greater than the elongation of the knitted fabric is naturally because the sinker loops become longer due to stretching, in the elastic weft knitted fabric of the present invention, needle loop portions are securely fixed in position even if stretched, it is difficult for needle loop portions to be stretched in the weft direction, and sinker loops are correspondingly stretched beyond the elongation of the knitted fabric, thereby resulting in the amount of change in the sinker loops being greater than the elongation of the knitted fabric.

The ratio of the change in loop length Lb/La in the elastic weft knit fabric according to the present invention can be made to satisfy the expression $1.15 \leq Lb/La \leq 1.75$ by reducing bending and winding of the elastic yarn by adjusting the depth (setting position) of the stitch needle cam, changing the sinker shape or adjusting the yarn supply rate, and controlling the density during dyeing processing in particular. Namely, since the density of the gray fabric of the knitted fabric increases greatly due to dyeing processing, the density typically increases to about 1.3 to 1.8 times that in the state of the gray fabric. This is because as a result of increasing the density to a certain degree for the purpose of increasing the contribution to elasticity in a conventional ordinary knitted fabric containing elastic yarn, a knitted fabric is produced that has favorable elasticity. In contrast, in the elastic weft knit fabric of the present invention, it is necessary that the elastic yarn in the knitted fabric be stretched efficiently during stretching of the knitted fabric for the purpose of allowing the generation of heat during stretching. Thus, the density of the knitted fabric after dyeing processing is preferably finished to have nearly the same density as that of the gray fabric so that the elastic yarn of the knitted fabric following dyeing processing is nearly perfectly straight, and the density is controlled to be the same density as that of the gray fabric during presetting in particular.

As a result of conducting studies on the elastic weft knit fabric of the present invention with respect to a knitted fabric design that allows heat to be generated during stretching using as low an elastic yarn content as possible so as to further facilitate a body movement when wearing as clothing, the inventors of the present invention found that the fineness ratio between the elastic yarn and the non-elastic yarn is important. Namely, even if the elastic yarn content is low, the temperature rise caused by heat generation during stretching can be large depending on the manner in which the elastic yarn is combined with the non-elastic yarn, while conversely, even if the elastic yarn content is high, there are combinations for which the temperature rise caused by heat generation during stretching is high and the knitted fabric stress is not excessively large depending on the manner in which the elastic yarn is combined with the non-elastic yarn, thus making the manner in which the elastic yarn and non-elastic yarn are used important. By making the fineness ratio between the elastic yarn that composes the stitch pattern of the finished weft knit fabric and the non-elastic yarn that composes the stitch pattern of the weft knit fabric in a finished product following dyeing and finishing to be 1.0 to 2.5, it is possible to preferably generate heat during stretching, while if the fineness ratio is less than 1.0, the modulus of the knitted fabric becomes high, making it difficult to move when worn as clothing, and in the case the fineness ratio exceeds 2.5, the texture becomes hard, which in addition to resulting in clothing that is difficult to move in, also prevents an adequate temperature rise caused by heat generation during stretching.

Furthermore, in the description of the present application, the stitch pattern of the elastic yarn that composes the weft knit fabric and the stitch pattern of the non-elastic yarn that composes the weft knit fabric are defined as indicated below.

Fineness is measured respectively and separately for the stitch pattern having the largest number of the needle loops composing the elastic yarn and the structure having the largest number of the needle loops composing the non-elastic yarn in the structure that composes the weft knit fabric (pattern of each course indicated in the knitting sequence). For example, the stitch pattern that composes the weft knit fabric of the elastic yarn of FIG. 1 refers to the pattern of knitting sequence 2 or 4 and the pattern that composes the weft knit fabric of the non-elastic yarn refers to the pattern of knitting sequence 1 or 3, the pattern that composes the weft knit fabric of the elastic yarn of FIG. 2 refers to any of knitting sequence 1, 3 or 5 and the pattern that composes the weft knit fabric of the non-elastic yarn is any of knitting sequence 1, 3 or 5, and the structure that composes the weft knit fabric of the elastic yarn of FIG. 3 is any of knitting sequence 1, 2, 4 or 5 and the pattern that composes the weft knit fabric of the non-elastic yarn is any of knitting sequences 1 to 6. This applies similarly in the case the non-elastic yarn is spun yarn. In the case a structure composed of the elastic yarn or the non-elastic yarn is composed of two or more types of yarns and have the same number of needle loops, the pattern that is composed of the yarn having the smallest fineness is used for the pattern that composes the weft knit fabric. Moreover, in the case the elastic yarn is a covered elastic yarn, such as a covering yarn, a twisted yarn or a jet-processed yarn, the fineness ratio is determined between the elastic yarn of the covered elastic yarn and the non-elastic yarn. In the case there are two or more types of non-elastic yarns used in a covered elastic yarn, the fineness ratio is determined between the finest non-elastic yarn and the elastic yarn. Moreover, in the case there are two or more types of elastic yarns, the fineness ratio is determined between the elastic yarn having the largest number of needle loops and the non-elastic yarn, and in the case of equal numbers of the needle loops, the fineness ratio is determined between the thickest elastic yarn and the non-elastic yarn.

In the elastic weft knit fabric according to the present invention, although the fineness ratio between the elastic yarn and the non-elastic yarn is 1.0 to 2.5, since the fineness ratio of an ordinary weft knit fabric is about 2.8 to 5.0, the elastic knit fabric of the present invention is characterized by the fineness of the elastic yarn being large in comparison with the fineness of the non-elastic yarn, and in the case of finishing the knitted fabric by knitting in an ordinary manner, the texture may be hard and the stress of the knitted fabric may be excessively high. Therefore, in the case of producing the elastic weft knit fabric of the present invention, it is important to knit the fabric so that the elastic yarn stretches more than normal and the apparent thickness of the elastic yarn in the knitted fabric is low, and more specifically, in the case the non-elastic yarn and the elastic yarn have the same stitch pattern, such as in the case of employing plating stitch, the elongation ratio between the non-elastic yarn and the elastic yarn (elongation ratio of the elastic yarn=braided amount of the non-elastic yarn/braided amount of the elastic yarn) is set to 3.0 to 3.8.

Moreover, the knitted fabric is also preferably finished during dyeing processing so as to be stretched slightly more than normal, and as a general indicator thereof, is finished at nearly the same density as that of gray fabric. As a result, although the elastic yarn content decreases slightly and the elastic yarn remains stretched in the knitted fabric, in contrast to the fineness of elastic yarn following dyeing processing of an ordinary weft knit fabric having the same fineness as that of a raw yarn or being several percent finer when a comparison is made between the fineness of the elastic raw yarn and the fineness of elastic yarn after dyeing processing, in the elastic weft knit fabric of the present invention, in the case of comparing the fineness of the elastic raw yarn and fineness following dyeing processing, the elastic yarn is about 10% to 20% finer after dyeing processing, and the knitted fabric stress can be lowered with only a small decrease in temperature rise caused by heat generation during stretching. Moreover, it is important during dyeing processing to use more severe heat treatment conditions during heat setting, such as by increasing the setting temperature or increasing setting time to set the knitted fabric while stretched and make the elastic yarn in the knitted fabric to be as fine as possible. In addition, as a general indicator for stretching and setting the knitted fabric, the elongation of a knitted fabric sampled at an initial length of 10.0 cm and width of 2.5 cm under a load of 9.8 N is preferably set to a maximum of within 180%.

Since the elastic weft knit fabric of the present invention is characterized by the fineness of the elastic yarn being large in comparison with the fineness of the non-elastic yarn with respect to an ordinary weft knit fabric, in the case of finishing a knitted fabric as is, the stress becomes high and the finished product tends to be difficult to move when worn. Therefore, in addition to the elastic yarn content and fineness ratio between the elastic yarn and the non-elastic yarn, the number of loops of the knitted fabric, which is the product of the density (courses/inch) in the warp direction and density (wales/inch) in the weft direction, is also important in the elastic weft knit fabric of the present invention, and by making the number of loops to be within a specific range, the balance between heat generation during stretching and the stress of the knitted fabric can be optimized, or in other words, the number of loops is preferably within the range of 3000 to 8000, and even if the elastic yarn content and the fineness ratio between the elastic yarn and the non-elastic yarn are within prescribed ranges, the temperature rise caused by heat generation during stretching may be low or the stress of the knitted fabric may be high. In other words, if the number of loops is less than 3000, the elongation of the knitted fabric is small and the temperature rise caused by heat generation during stretching is low, while in the case the number of loops exceeds 8000, the stress of the knitted may be high and clothing becomes difficult to move, and in the case the number of loops is less than 3000 in particular, in addition to a greater feeling of tightness when worn as clothing, air permeability of the knitted fabric may become high, which in addition to lowering the temperature rise caused by heat generation during stretching per se, prevents the clothing from feeling warm due to the large amount of outside air that flows in due to the high air permeability even if heat is generated during stretching. As a result, the number of loops is preferably 3000 to 8000 and more preferably 3500 to 7500. The number of loops can be controlled by controlling the fineness ratio, a gauge of the knitting machine and parameters during dyeing processing, and increasing the number of loops is easily achieved by decreasing the fineness ratio, using a smaller gauge for the knitting machine, tentering the knitted fabric with dyeing processing or run-on processing. In particular, the wales of the knitted fabric are designed to be 40 to 70 wales/inch. In addition, it is more important that that the elastic yarn be knit at a shorter braiding length than normal when knitting the elastic yarn, and in the case the elastic yarn and the non-elastic yarn have the same stitch pattern in the case of plating stitch, the braiding length ratio between the elastic yarn and the non-elastic yarn is 3.0 or more, or in other words, the loop length (braided amount) of the elastic yarn is made to be shorter than the loop length of the non-elastic yarn and braided at high tension by stretching by 3.0 times or more, and even in the case the stitch pattern of the elastic yarn is different from that of the non-elastic yarn, the elastic yarn is braided at high tension. Moreover, in the case of knitting the elastic yarn in the form of a covered elastic yarn, the covered elastic yarn is produced while stretching the elastic yarn by 3.0 times or more than normal when producing the covered elastic yarn, and the number of loops can be easily controlled by knitting at high tension on a knitting machine, thereby allowing the obtaining of a knitted fabric that demonstrates a high temperature rise caused by heat generation during stretching.

The elastic weft knit fabric according to the present invention can be produced with circular knitting machines, such as hosiery knitting machines, single knit circular knitting machines including small cylinder diameter knitting machines or double knit circular knitting machines, and the stitch can be formed with a stitch consisting mainly of knit loops, such as a plain stitch pattern or an interlock stitch. In the case of a plain stitch, in particular, a 32 gauge or larger knitting machine is used preferably, while in the case of an interlock stitch, the stitch is preferably knit by employing plating stitch using both an elastic yarn and a non-elastic yarn, and in order to facilitate a body movement when exercising while wearing knitted fabric clothes having an interlock pattern, the objective of the present invention can be achieved by using a method such that plating stitch operation using an elastic yarn is employed for every other course instead of for all courses. In order to further enhance the effect of generating heat during stretching, further arranging tuck loops and welt loops (although also referred to as miss loops, they are referred to as welt loops in the present application) in the knitted fabric is preferable since the temperature rise caused by heat generation during stretching becomes higher as the number of these loops increases. With respect to the method by which tuck loops and welt loops are used, although forming tuck loops or welt loops with an elastic yarn is the most effective for heat generation during stretching, a non-elastic yarn can be used for the tuck loop or welt loops and at least either of the knit loops in front of and in back of the tuck loops or welt loops can be formed with the elastic yarn, and if the tuck loops or welt loops are formed with the elastic yarn and at least either of the needle loops in front of and in back of the tack loops or welt loops are also formed with the elastic yarn, all the loops are formed in which the elastic yarn is stretched, thereby allowing the stretched loops to demonstrate a high temperature rise caused by heat generation during stretching. In addition, since elongation decreases as the number of these tuck loops and welt loops increases, which tends to result in a knitted fabric that is difficult to be stretched, the number of courses in which tuck loops or welt loops are continuously formed in the course direction (warp direction of the knitted fabric) is preferably no more than two courses, and since elongation of the knitted fabric decreases significantly if continuously formed in three courses or more, this should be avoided other than for the purpose of decreasing elongation. Thus, although it is preferable to continuously form tuck loops or welt loops in no more than two courses, in this case, continuous formation of tuck loops or welt loops is preferably no more than two courses even in the case of combinations of tuck loops and welt loops. Furthermore, although continuous formation of tuck loops or welt loops is to be no more than two courses, there are no limitations on the continuous formation thereof in the diagonal direction, there are also no limitations in the wale direction (weft direction), and they can be continuously formed over a range that enables knitting. Moreover, the tuck loops or welt loops may be composed of a bare elastic yarn or a covered elastic yarn obtained by covering with a non-elastic yarn, a twisted yarn or a jet-processed yarn.

In the elastic weft knit fabric of the present invention, although tuck loops or welt loops are preferably formed in the knitted fabric, these tuck loops or welt loops may be formed alone or in combination, and examples of combinations that can be used include a pattern in which a knit loop and tuck loop or welt loop are arranged alternately or in arbitrary repeating units in the wale direction, and a pattern in which a knit loop and a tuck loop or a welt loop are arranged alternately or in arbitrary repeating units in the course direction.

With respect to the ratio between knit loops and tuck loops and/or welt loops in the knitted fabric, the number of tuck loops and/or welt loops on at least one side of the knitted fabric is adjusted to be 20% to 60% of the total number of loops on the front of the knitted fabric. If the percentage of tuck loops and/or welt loops is less than 20%, the effects of heat generation during stretching are diminished and the resulting knitted fabric is resistant to generation of heat, while if the percentage exceeds 60%, although the temperature rise caused by heat generation during stretching is large, the resulting fabric is difficult to stretch, resulting in a product in which it is difficult to move when worn as clothing, thereby making this undesirable. Thus, the ratio of tuck loops and/or welt loops is 20% to 60% and preferably 25% to 50%. Furthermore, the ratio of tuck loops and/or welt loops in the knitted fabric is calculated from the respective numbers of knit loops, tuck loops and welt loops in a typical stitch pattern of the knitted fabric. Naturally, although a design can also be employed in which a portion of the knitted fabric consisting only of knit loops accounts for the greatest area, while portions incorporating tuck loops or welt loops are present in the form of stripes or islets, in this case, since the temperature rise caused by heat generation during stretching is low in the portion composed of knit loops, considerations are given with respect to the finished product so that portions in which tuck loops or welt loops are formed are located at sites that are stretched over the knees and elbows.

Furthermore, in the case of a circular knitting machine, it is important that these tuck loops and/or welt loops be arranged within at least one pattern of the cylinder or dial, and the cylinder and dial are treated as being respectively independent and are evaluated based on the shape of loops formed on each side. In addition, although tuck loops and/or welt loops are preferably formed with both an elastic yarn and a non-elastic yarn, they may also be formed with the elastic yarn only or the non-elastic yarn only.

Ordinary dyeing and finishing treatments can be used for the method used to dye and finish the elastic weft knit fabric of the present invention, dyeing conditions are used corresponding to the fiber material used, the dyeing machine used is also arbitrary, with examples thereof including a jet dyeing machine, a wince dyeing machine and a paddle dyeing machine, and a processing agent for improving moisture absorption and softness as well as a processing agent for enhancing moisture retention can be used.

The elastic weft knit fabric of the present invention can be used as clothing that becomes warm as a result of engaging in daily activities or exercise if fabricated into clothing that covers joints over which the knitted fabric is stretched during a body movement when worn, examples of which include bottoms, such as sportswear in the manner spats, sports tights, compression tights or girdles, or innerwear, tops, such as undershirts, sports shirts or compression shirts, leg wear, such as panty hose, socks, tights or leggings, supporters, such as elbow supporters, knee supporters, lower back supporters, ankle covers, arm covers, leg covers, knee covers or elbow covers, and gloves.

In the case of compression wear or compression shirts in particular, namely long-sleeve or short-sleeve shirts and spats worn above the knee, below the knee or down to the ankles, which are worn tightly against the skin primarily during jogging, various games, walking and other forms of exercise with the aim of improving athletic performance, protecting from injury or retaining heat, since particularly high heat generation effects are obtained if it is in the form of a knitted fabric that has a fabric weight of about 150 g/m$^2$ to 300 g/m$^2$, contains 40 g/m$^2$ to 50 g/m$^2$ of an elastic yarn, has a fineness ratio between the elastic yarn and a non-elastic yarn of 1.0 to 2.2 and has a stress ratio of about 0.60 to 0.80, and the knitted fabric is used at joints, such as the elbows, knees, hips or ankles, sportswear is preferably sewn so that the knitted fabric of the present invention is at least used at these joints. In order to further enhance the effect of protecting joints and etc., sites where the elongation of the elastic yarn is low can be provided near joints, and a function for protecting joints and etc. is added by a method used to produce the sites of low elongation, examples of which include a method that prevents the stitches from stretching by employing the stitch pattern difficult to be stretched when producing the fabric, a method that combines a stretch-resistant tape-like material by seaming or adhesion prior to sewing the finished product, and a method that holds the stitches in position with the seams of the fabric.

In addition, in the case of bottoms in the manner of tights, leggings socks and other thin legwear manufactured with a circular knitting machine having a cylinder diameter of about 24 inches to 38 inches, a small size circular knitting machine having a cylinder diameter of about 8 inches to 20 inches, a panty hose knitting machine having a cylinder diameter of about 4 inches or a circular knitting machine, such as a hosiery knitting machine, use of the elastic weft knit fabric of the present invention allows the obtaining of clothing that becomes warm as a result of engaging in daily activities and exercise. Moreover, if a knitted fabric is used in which the elastic yarn content is 20 g/m$^2$ to 40 g/m$^2$, the fineness ratio between an elastic yarn and a non-elastic yarn is 1.5 to 2.5, and the stress ratio is about 0.40 to 0.60, the resulting bottom clothing item has superior heat-retaining properties and effects are demonstrated that prevent injuries by warming muscles and joints at sites where the knitted fabric is stretched. In the case of these products as well, sites having low elongation can be provided in the vicinity of joints and etc. for the purpose of protection of joints or creating a more attractive lower body appearance, examples of methods used to produce sites of low elongation include a method that prevents the pattern from stretching when producing the fabric, a method that combines a stretch-resistant tape-like material by seaming or adhesion prior to sewing the finished product, and a method that holds the stitches in position with the seams of the fabric, and functions, such as protecting joints or creating a more attractive lower body appearance are added by these methods.

Moreover, thin innerwear, such as undergarments can be produced with a circular knitting machine having a cylinder diameter of about 24 inches to 38 inches or a small size circular knitting machine having a cylinder diameter of about 8 inches to 20 inches, and if the elastic weft knit fabric of the present invention is applied and worn as clothing, the resulting clothing becomes warm as a result of engaging in daily activities. Moreover, if a knitted fabric is employed in which the elastic yarn content is 20 g/m$^2$ to 40 g/m$^2$, the fineness ratio between the elastic yarn and the non-elastic yarn is 1.5 to 2.5, and the stress ratio is about 0.40 to 0.50, an undergarment is obtained that is easy to move, has superior heat-retaining properties, becomes warm even when not moving, and becomes even warmer by engaging in movement by combining with a heat-generating material, in particular, such as a hygroscopic and a heat-generating materials.

[Warp Knit Fabric]

A warp knit fabric according to the present invention, or in other words, an elastic warp knit fabric (hereinafter to be explained using the same expression) is a warp knit fabric comprising a non-elastic yarn and an elastic yarn that is produced with a 26 gauge to 40 gauge warp knitting machine having multiple reeds, and in which the content of the elastic yarn is 30 g/m$^2$ to 60 g/m$^2$, the stress ratio, determined from the stretching stress and the stress of elastic recovery at the 50% elongation during stretching and recovery after having stretched the weft knit fabric to 80% elongation followed by returning to its original length, is 0.40 to 0.80, and the instantaneous temperature rise caused by heat generation during stretching in at least one of the warp and weft directions is 1.0° C. or more.

In the elastic warp knit fabric of the present invention, the elastic yarn content thereof is important since the elastic yarn greatly contributes to heat generation during stretching in order to make the instantaneous temperature rise caused by heat generation when stretched to 60% to 100% elongation to be 1.0° C. or more, and it is therefore necessary that the elastic yarn be contained in the knitted fabric at 30 g/m$^2$ to 60 g/m$^2$. Since the temperature rise caused by heat generation becomes larger as the elastic yarn content increases, the elastic yarn content in the knitted fabric is preferably 25 g/m$^2$ to 45 g/m$^2$. If the elastic yarn content is excessively low, the temperature rise caused by heat generation during stretching is small, while if the elastic yarn content is excessively high, the weight of the knitted fabric increases and the modulus of the knitted fabric becomes high, and since this results in difficulty in moving when used as clothing, the elastic yarn content is made to be 40 g/m$^2$ to 60 g/m$^2$.

In the elastic warp knit fabric, there is extremely little winding and bending of the elastic yarn in the knitted fabric and the elastic yarn stretches while the knitted fabric stretches efficiently, and as a result thereof, the knitted fabric generates a large amount of heat during stretching. A structural difference between a conventional knitted fabric and the elastic warp knit fabric of the present invention lies in the loop ratio as determined from Lb/La, and in order to realize a knitted fabric that generates a large amount of heat during stretching, Lb/La preferably satisfies the expression 1.15≤Lb/La≤1.75, and Lb/La can be made to be within this range by adjusting the stitch pattern and conditions in the dyeing processing step. If Lb/La is within this range, the knitted fabric generates heat during stretching without impairing the fee when worn. Furthermore, if Lb/La is less than 1.15, the elongation rate of elastic yarn in the knitted fabric becomes low, and as a result thereof, is so low as to prevent perception of a temperature rise caused by heat generation during stretching. Moreover, due to poor stretching and elastic recovery of the elastic yarn, the stretched knitted fabric does not return to its original position and is susceptible to the occurrence of undulation and deformation of shape. In addition, if the value of Lb/La exceeds 1.65, the modulus of the elastic yarn becomes excessively high, thereby not only resulting in clothing that is difficult to wear and difficult to move, but also as a result of considerable deformation of the knitted fabric and deformation of both the elastic yarn and the non-elastic yarn being excessively large, the elastic recovery is inadequate, thereby causing the knitted fabric to undergo undulation when stretching is relaxed or dimensional changes during laundering that lead to loss of shape. Thus, La and Lb preferably satisfy the expression 1.15≤Lb/La≤1.65 and more preferably satisfy the expression 1.20≤Lb/La≤1.60. As a result, in addition to generating heat as a result of stretching, clothing can be obtained that does not lose its shape when worn or laundered.

Figure 5:
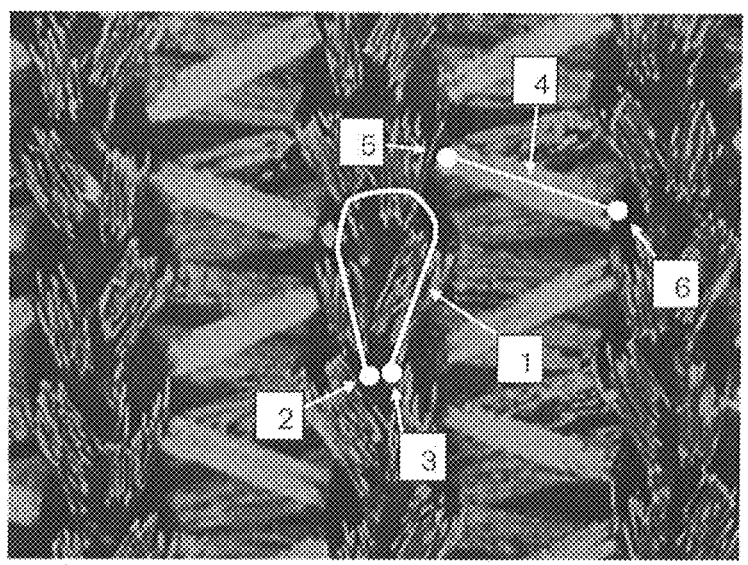
FIG. 5 is a drawing for explaining a method used to measure the length of a needle loop of a non-elastic yarn and the length of a sinker loop of an elastic yarn of an elastic warp knit fabric according to the present invention.

An explanation is provided of the method used to measure each loop length with reference to FIG. 5. The knitted fabric is stretched by 30% elongation in both the warp and weft directions followed by magnifying and observing the needle loop side of the knitted fabric while in that state. As shown in FIG. 5, the two lowermost portions of a needle loop able to be observed on both sides of the lower portion of a needle loop of the non-elastic yarn were respectively designated as endpoint 2 and endpoint 3, the loop length extending from endpoint 2 to endpoint 3 was measured, and that length was used as the length of a needle loop (1) of the non-elastic yarn. With respect to sinker loops, as shown in FIG. 5, both ends of elastic yarn between two needle loops observed between two wales were designated as sinker loop endpoint 5 and endpoint 6, the length between them was measured, and that length was used as the length of a sinker loop (4) of the elastic yarn.

In the case the elastic yarn is covered by a non-elastic yarn, such as in the case of using a covering yarn, the length of the elastic yarn is measured by estimating those sites where the elastic yarn is present. In this case, the elastic yarn is measured by assuming that the elastic yarn of those portions covered with the non-elastic yarn is present in linear form. In addition, in the case sinker loops are straddling two or more wales as a result of the elastic yarn employing a double needle swing, sinker loops at those portions covered by needle loops present at an intermediate location in the sinker loops are not measured, but rather only the lengths of sinker loops observed from the surface are measured, and the sum of the sinker loop lengths of each wale is used for the sinker loop (4) length.

The length of the central portion of fiber bundles in the direction of width is measured for both the elastic and the non-elastic yarn. Following completion of each measurement, the length of sinker loops (4) of the elastic yarn is added to the length of needle loops (1) of the non-elastic yarn and the total length of loops in one unit of the stitch pattern is determined and designated as La. Next, the knitted fabric is further stretched by 50% elongation in the warp direction or weft direction, and the total length of loops in one unit of the stitch pattern is similarly determined and designated as Lb. This measurement is then carried out in both the warp direction and weft direction and the expression 1.15≤Lb/La≤1.65 is satisfied in the direction of either warp direction or weft direction. Furthermore, in the case the knitted fabric is only able to stretch in one direction, loop length is determined by measuring only in the direction in which the knitted fabric can be stretched.

Furthermore, although the knitted fabric is further stretched in one of either the warp or weft direction when measuring Lb and the elongation at this time is basically 50% elongation, in the case the elongation of the knitted fabric is low and it is difficult to stretch, a sample of the knitted fabric having an initial length of 10.0 cm and width of 2.5 cm is taken and Lb is measured by stretching that knitted fabric under a load of 22.05 N.

In measuring La and Lb, the length of each loop is measured by the order of micron (μm), the length is determined to at least the third decimal place, and 10 arbitrary locations are measured, followed by determining the average length. Lb/La is then calculated based on this average length and the result is rounded to the third decimal place.

In addition, a single unit of the stitch pattern refers to a single unit that is repeated in a pattern consisting of a needle loop and a sinker loop, and in the case, for example, knit loops and sinker loops are repeated according to a fixed rule, such as in a Denbigh pattern, the length obtained by adding one knit loop or one sinker loop becomes La or Lb, while in the case of repeating knitting and insertion in the course direction for each course, loops of the inserted portions are also treated as knit loops, and the length obtained by adding one knit loop, a loop of an inserted portion and two sinker loops becomes La or Lb.

In addition, in the case of stretching by 50% elongation in the warp direction, mainly the needle loops are stretched while there is little stretching of sinker loops. On the other hand, in the case of having stretched by 50% elongation in the weft direction, mainly the sinker loops are stretched while there is typically little stretching of needle loops. Thus, the needle loops greatly contribute to generation of heat during stretching when stretched in the warp direction, while conversely the sinker loops greatly contribute to generation of heat during stretching when stretched in the weft direction. In the case of extracting only the amount of change in needle loops when measuring La and Lb while focusing only on each of these loops, the amount of change in the needle loops during stretching by 50% elongation in the warp direction is preferably 1.1 to 1.6 times in comparison with before stretching, while the amount of change in the sinker loops during stretching by 50% elongation in the weft direction is preferably 1.8 to 4.0 times in comparison with before stretching. Furthermore, in this case, although the reason for the amount of change being greater than the elongation of the knitted fabric is naturally because the sinker loops become longer due to stretching, in the elastic weft knit fabric of the present invention, needle loop portions are securely fixed in position even if stretched, it is difficult for needle loop portions to be stretched in the weft direction, and sinker loops are correspondingly stretched beyond the elongation of the knitted fabric, thereby resulting in the amount of change in the sinker loops being greater than the stretched amount of the knitted fabric.

The ratio of the change in loop length Lb/La in the elastic warp knit fabric according to the present invention can be made to satisfy the expression 1.15≤Lb/La≤1.65 by reducing bending and winding of the elastic yarn by changing the runner length and the sinker shape and adjusting the knocking over depth, and further controlling, in particular, the density during dyeing processing. Namely, since the density of the gray fabric of the knitted fabric increases greatly due to dyeing processing, the density typically increases to about 1.3 to 1.8 times the density of the gray fabric. This is because as a result of increasing the density to a certain degree for the purpose of increasing the contribution to elasticity in a conventional ordinary knitted fabric containing an elastic yarn, a knitted fabric is produced that has favorable elasticity. In contrast, in the elastic warp knit fabric of the present invention, it is necessary that the elastic yarn in the knitted fabric be stretched efficiently during stretching of the knitted fabric for the purpose of allowing the generation of heat during stretching. Thus, the density of the knitted fabric after dyeing processing is preferably finished to nearly the same density as that of the gray fabric so that the elastic yarn of the knitted fabric following dyeing processing is nearly perfectly straight, and the density is controlled to be the same as that of the gray fabric during presetting in particular.

As a result of conducting studies on the elastic warp knit fabric of the present invention with respect to a knitted fabric design that allows heat to be generated during stretching using as low an elastic yarn content as possible so as to further facilitate a body movement when wearing as clothing, the inventors of the present invention found that the fineness ratio between the elastic yarn and the non-elastic yarn is important. Namely, even if the elastic yarn content is low, the temperature rise caused by heat generation during stretching can be large depending on the manner in which the elastic yarn is combined with the non-elastic yarn, while conversely, even if the elastic yarn content is high, there are combinations for which the temperature rise caused by heat generation during stretching is high and knitted fabric stress is not excessively large depending on the manner in which the elastic yarn is combined with the non-elastic yarn, thus making the manner in which the elastic yarn and the non-elastic yarn are used important. By making the fineness ratio between the elastic yarn that composes the warp knit fabric and the non-elastic yarn that composes the warp knit fabric in a finished product following dyeing and finishing treatments to be 1.0 to 2.5, it is possible to preferably generate neat during stretching, while if the fineness ratio is less than 1.0, the modulus of the knitted fabric becomes high making it difficult to move when worn as clothing, and in the case the fineness ratio exceeds 2.5, the texture becomes hard, which in addition to resulting in clothing that is difficult to move, also prevents an adequate temperature rise caused by heat generation during stretching.

Furthermore, the pattern of an elastic yarn that composes the warp knit fabric and the pattern of a non-elastic yarn that composes the warp knit fabric are defined as indicated below in the description of the present application.

Fineness is respectively measured for each of a pattern composed of a warp knit fabric obtained using multiple reeds having the largest number of knit loops for both an elastic yarn and a non-elastic yarn, a stitch pattern obtained with reeds having the largest number of knit loops in the case the elastic yarn and the non-elastic yarn use multiple reeds, a pattern obtained with reeds having the largest number of knit loops of the thickest yarn in the case of the elastic yarn when respectively using multiple reeds, and a pattern obtained with reeds having the largest number of knit loops of the non-elastic yarn in the case of the non-elastic yarn.

For example, in a pattern with three reeds, in the case of a front 54 dt cord pattern composed of a non-elastic yarn, a middle 33 dt Denbigh pattern composed of a non-elastic yarn, and a back 33 dt Denbigh pattern composed of an elastic yarn, the fibers used as the elastic yarns that compose a warp knitted fabric are the 33 dt fibers, the fibers used as the non-elastic yarns that compose a warp knit fabric are the 33 dt fibers, and the fineness ratio thereof is determined.

In the elastic warp knit fabric according to the present invention, although the fineness ratio between the elastic yarn and the non-elastic yarn is 1.0 to 2.5, since the fineness ratio of ordinary warp knit fabric is about 2.8 to 5.0, the elastic warp knit fabric of the present invention is characterized by the fineness of the elastic yarn being large in comparison with the fineness of the non-elastic yarn, and in the case of finishing this knitted fabric by knitting in an ordinary manner, the texture may be hard and the knitted fabric stress may be excessively high. Therefore, in the case of producing the elastic warp knit fabric of the present invention, it is important to produce the fabric during knitting so that the elastic yarn stretches more than normal and the apparent thickness of the elastic yarn in the knitted fabric is low, and more specifically, so that runners of elastic yarn are as short as possible.

Moreover, the knitted fabric is also preferably finished during dyeing processing so as to be stretched slightly more than normal, and as a general indicator thereof, is finished at nearly the same density as that of the gray fabric. As a result, the elastic yarn content decreases slightly because the elastic yarn remains stretched in the knitted fabric. When a comparison is made between the fineness of the elastic raw yarn and the fineness of the elastic yarn after dyeing of an ordinary fabric, the elastic yarn following dyeing processing has the same fineness as that of a raw yarn or being several percent finer. In the elastic knitted fabric of the present invention, when comparing the fineness of elastic raw yarn and the fineness following dyeing processing, is about 10% to 20% finer after dyeing processing, and knitted fabric stress can be lowered with only a small decrease in temperature rise caused by heat generation during stretching. Moreover, it is important during dyeing processing to use more severe heat treatment conditions during heat setting, such as by increasing the setting temperature or increasing setting time to set the knitted fabric while stretched and make the elastic yarn in the knitted fabric to be as fine as possible. In addition, as a general indicator for stretching and setting the knitted fabric, the elongation of a knitted fabric sampled at an initial length of 10.0 cm and width of 2.5 cm under a load of 9.8 N is preferably set to a maximum of within 180%.

Since the elastic warp knit fabric of the present invention is characterized by the fineness of the elastic yarn being large in comparison with the fineness of the non-elastic yarn with respect to an ordinary weft knit fabric, in the case of finishing a knitted fabric as is, the stress becomes high and the finished product tends to be difficult to move when worn. Therefore, in addition to the elastic yarn content and the fineness ratio between the elastic yarn and the non-elastic yarn, the number of loops of the knitted fabric, which is the product of the density (courses/inch) in the warp direction and density (wales/inch) in the weft direction, is also important in the elastic weft knit fabric of the present invention, and by making the number of loops to be within a specific range, balance between heat generation during stretching and the stress of the knitted fabric can be optimized, or in other words, the number of loops is preferably within the range of 5000 to 12000, and even if the elastic yarn content and the fineness ratio between the elastic yarn and the non-elastic yarn are within the prescribed ranges, the temperature rise caused by heat generation during stretching may be low or the stress of the knitted fabric may be high. In other words, if the number of loops is less than 5000, the elongation of the knitted fabric is small, and the temperature rise caused by heat generation during stretching is low, while in the case the number of loops exceeds 12000, the stress of the knitted fabric may be high and clothing becomes difficult to move, and in the case the number of loops is less than 5000 in particular, in addition to a greater feeling of tightness when worn as clothing, air permeability of the knitted fabric may become high, which in addition to lowering the temperature rise caused by heat generation during stretching per se, prevents the clothing from feeling warm due to the large amount of outside air that flows in due to the high air permeability even if heat is generated during stretching. As a result, the number of loops is preferably 5000 to 12000 and more preferably 5500 to 11500. The number of loops can be controlled by controlling the fineness ratio, the gauge of the knitting machine and parameters during dyeing processing, and increasing the number of loops is easily achieved by decreasing the fineness ratio, using a smaller gauge for the knitting machine, tentering the knitted fabric with dyeing processing or run-on processing. In particular, the wales of the knitted fabric are designed to be 50 to 80 wales/inch. In addition, it is more important that the elastic yarn be knit using shorter runners than normal when knitting the elastic yarn. However, since problems, such as yarn breakage occur if the runners are excessively short, the runners are shortened only as much as is permitted.

Although the elastic warp knit fabric according to the present invention can be produced with an ordinary single tricot knitting machine, a double tricot knitting machine, a single raschel knitting machine or a double raschel knitting machine using an ordinary pattern for the knitted pattern, continuous inlay stitch patterns are preferably used in two courses or less. In particular, in an elastic yarn pattern knitted with a single tricot knitting machine or single raschel knitting machine, knit loops are preferably formed with open laps, and as a result thereof, the stitch pattern can be made to allow ease of movement of a body when worn as clothing. Preferable examples of open lap patterns include patterns in which all knit loops are open laps, such as 01/21, 01/32 or 01/12/32 patterns. Furthermore, these open laps may be a bare elastic yarn or a covered elastic yarn generated by covering with a non-elastic yarn, a twisted yarn or a jet-processed yarn. Open laps, closed laps or combinations of open laps and closed laps can be arbitrarily selected for the non-elastic yarn.

The elastic warp knit fabric of the present invention can be used as clothing that becomes warm as a result of engaging in daily activities or exercise if sewn into clothing that covers joints over which the knitted fabric is stretched during movement of a body when worn, examples of which include bottoms, such as sportswear in the manner spats, sports tights, compression tights or girdles, or innerwear, tops, such as undershirts, sports shirts or compression shirts, leg wear, such as panty hose, socks, tights or leggings, supporters, such as elbow supporters, knee supporters, lower back supporters, ankle covers, arm covers, leg covers, knee covers or elbow covers, and gloves.

In the case of compression wear or compression shirts in particular, namely long-sleeve or short-sleeve shirts and spats worn above the knee, below the knee or down to the ankles, which are worn tightly against the skin primarily during jogging, various games, walking and other forms of exercise with the aim of improving athletic performance, protecting from injury or retaining heat, since particularly high heat generation effects are obtained if it is in the form of a knitted fabric that has a fabric weight of about 150 $g/m^2$ to 300 $g/m^2$, contains 40 $g/m^2$ to 50 $g/m^2$ of elastic yarn, has a fineness ratio between the elastic yarn and the non-elastic yarn of 1.2 to 2.2 and has a stress ratio of about 0.50 to 0.70, and the knitted fabric is used at joints, such as the elbows, knees, hips or ankles, it is preferably sewn so that the knitted fabric of the present invention is at least used at these joints. In order to further enhance the effect of protecting joints and etc., sites of the fabric whose elongation is low can be provided near joints, and a function for protecting joints and etc. is added by a method used to produce sites of the fabric whose elongation is low, examples of which include a method that prevents stretching using chain or inlay stitches when knitting the fabric, a method that combines a stretch-resistant tape-like material by seaming or adhesion prior to sewing the finished product, and a method that holds the fabric in position with the seams of the fabric.

EXAMPLES

Although the following provides a detailed explanation of the present invention through examples thereof, the present invention is not limited to only these examples. Furthermore, evaluations used in the examples were carried out according to the methods indicated below.

(1) Sampling

The following measurements of the knitted fabric are basically carried out at random locations in the fabric. However, in case that fabric performance of the knit fabric varies at one location and another according to a knit stitch pattern, yarn usage, or the presence or absence of a resin printed pattern and etc., the performance of the present invention cannot be confirmed. Therefore, the measurements are preferentially carried out at locations where there is a high possibility of the performance of the present invention being demonstrated and sampling is carried out so that the measurements in the knitted fabrics can be respectively carried out in the warp direction and the weft direction.

The sampling location may be selected at random and sampling is carried out so that the measurements can be respectively carried out in the warp direction and the weft direction in knitted fabrics in which a knit stitch pattern, yarn usage, and the presence or absence of a resin printed pattern and etc. are uniform.

(2) Instantaneous Temperature Rise Caused by Heat Generation

Instantaneous temperature rise caused by heat generation during stretching is determined by measuring the highest sample surface temperature: While stretching and recovering of a knitted fabric (sample) are repeated a prescribed number of times at a prescribed speed using the repeating stretching tester indicated below, the instantaneous temperature rise of the sample in the warp direction and the weft direction is measured and then the highest temperature rise in the both directions is taken to be the instantaneous temperature rise caused by heat generation. Furthermore, the stress ratio and the heat generation efficiency during stretching in the direction demonstrating the highest instantaneous temperature rise due to heat generation are also indicated for the following stress ratio and the heat generation efficiency during stretching.

Repeated stretching machine: De Mattia Tester (manufactured by Daiei Kagaku Seiki Mfg. Co., Ltd.)

Sample size: Length 100 mm (excluding gripping portions), width 60 mm

Measuring environment: Measurements are carried out under constant temperature and constant humidity conditions of a temperature of 20° C. and humidity of 65% RH. Measurements are made in a state in which energy other than that attributable to stretching is not received from the outside.

Elongation (%) by De Mattia tester: The elongation (%) is obtained by stretching a knitted fabric having a width of 2.5 cm under a load of 9.8 N. The elongation in the case of knitted fabric elongation of 100% or more is defined to be 100%, and the elongation (%) in the case of knitted fabric elongation of 60% to less than 100% is the same as the elongation under a load of 9.8 N.

Repeated stretching cycle: 2 times/second

Measurement of temperature rise caused by heat generation: The sample surface temperatures while repeatedly stretching 100 times and following completion of stretching and recovery, are measured continuously by a thermography. The emissivity of thermography is set to 1.0.

Evaluation of temperature rise caused by heat generation: The temperature of the sample surface is measured when it has reached the highest temperature, and the rise in temperature based on a comparison with the temperature prior to stretching is taken to be the instantaneous temperature rise caused by heat generation.

Knitted fabric elongation: The elongation (%) under a load of 9.3 N is measured by stretching under the conditions indicated below, using a Tensilon tensile tester (Model RTC-1210A, Orientec Co., Ltd.) at a length of 100 Lm (excluding gripping portions) and width of 25 mm, and determining as a percentage (%) of the elongation while rounding to the first decimal place.

Initial load: 0.1 N

Stretching speed and recovery speed: 300 mm/min

Stretching length: Elongation (%) under a load of 9.8 N

Measurement: Elongation (%) is respectively measured in the warp direction and the weft direction at a load of 9.8 N by stretching under the aforementioned conditions.

(3) Elastic Yarn Content

The elastic yarn content (g/m$^2$) in the knitted fabric is determined according to the following method and rounded to the first decimal place.

A non-elastic yarn in the knitted fabric is removed by dissolution and etc. and the weight of only the elastic yarn is measured followed by converting to the weight per unit fabric area. If it is difficult to remove the non-elastic yarn, the elastic yarn is removed from the knitted fabric by dissolution and etc. after measuring the weight of the knitted fabric followed by measuring the weight of the non-elastic yarn only and taking the amount of the reduction in that weight to be the weight of the elastic yarn.

(4) Stress Ratio

Stress ratio is measured according to the method indicated below.

Sample size: Length 100 mm (excluding gripping portions), width 25 mm

Tensile tester: Tensilon tensile tester (Model RTC-1210A, Orientec Co., Ltd.)

Initial load: 0.1 N

Stretching speed and recovery speed: 300 mm/min

Elongation (%) and measurement: The knitted fabric is stretched to 80% elongation followed by recovering (returning) to its original length at the same speed after stretching, stretching and recovery operation is repeated three times under these conditions, the stretching stress and the stress of elastic recovery at 50% elongation during the third stretching and recovery operation are determined, and the stress ratio is determined according to the following equation. Furthermore, in the case of a knitted fabric in which the elongation (%) measured during measurement of instantaneous temperature rise due to heat generation of section (1) is 60% to 80% elongation, the stretching stress and the stress of elastic recovery at 50% elongation during stretching and recovery are determined after stretching the knitted fabric to 60% elongation, followed by determining the stress ratio according to the following equation and rounding to the third decimal place.

Stress ratio=(stress of elastic recovery (N) at 50% elongation)/(stretching stress (N) at 50% elongation)

(5) Heat generation index: Heat generation index is determined from the elongation and the stress ratio according to the following equation followed by rounding to the first decimal place.

Heat generation index=(elongation (%) under load of 9.8 N)×(stress ratio)

Furthermore, the elongation is the same as the elongation determined in the aforementioned section (2), while the stress ratio is the same as the stress ratio determined in the aforementioned section (4).

Example 1

When knitting Pique stitches of Pique fabric partially containing tuck stitches as shown in FIG. 1 using a single knit circular knitting machine having 32 gauge, 44 dtex elastic yarn (trade name: Roica SF, Asahi Kasei Fibers Corp.) and 56 dtex/36 f polyester of 1-heater processing type as a non-elastic yarn were used to knit tuck stitches only by employing plating stitch with the elastic yarn, followed by knitting plain jersey stitches only with the non-elastic yarn. Furthermore, the fabric was produced under the condition that the stretching ratio between the non-elastic yarn and the elastic yarn in the tuck stitch pattern is 3.2.

The resulting knitted fabric was subjected to relaxation and scouring treatment by a continuous scouring machine followed by carrying out presetting nearly at the width of the gray fabric for 90 seconds at 190° C., and subsequently carrying out dyeing of the polyester with a jet dyeing machine. After dyeing, a polyester-based hygroscopic fabric softener was imparted followed by carrying out final setting at a density nearly equal to that for the dyeing treatment for 60 seconds at 170° C. to produce a knitted fabric.

The results of evaluating the performance of the obtained knitted fabric are shown in the following Table 1. In the knitted fabric of the present invention of Example 1, the instantaneous temperature rise caused by heat generation during stretching was 1.0° C. or more and the knitted fabric was able to be made into a clothing item that facilitates a body movement.

Examples 2 to 5 and Comparative Example 1

Knitted fabrics were produced and evaluated in the same manner as Example 1, with the exception of producing a knitted fabric in which an elastic yarn content had been reduced (Example 2) by tentering the content than that in Example 1, producing knitted fabrics in which the fineness of an elastic yarn and a non-elastic yarn had been changed (Examples 3 and 4), and producing a knitted fabric in which the loop length had been shortened and the stretching rate of the elastic yarn had been changed in Example 4 (Example 5). Furthermore, in Comparative Example 1, in addition to the aforementioned changes, the presetting conditions were set to 185° C. and 60 seconds. The results are shown in the following Table 1.

Examples 6 and 7

In addition, after the polyurethane polymer (Agent A) used in Example 4 of Japanese Unexamined Patent Publication No. H7-316922 and the urethane-urea compound (Agent B) used in Example 1 in Japanese Unexamined Patent Publication No. 2001-140127 were prepared, the elastic yarns having different modulus values were produced by adding Agent A at 7% by weight and Agent B at 3% by weight (Example 6) or adding Agent A at 3% by weight and Agent B at 6% by weight (Example 7) to the spinning bath, when producing 44 dtex elastic yarn (trade name: Roica CR, Asahi Kasei Fibers Corp.), and knitted fabrics were produced and evaluated in the same manner as Example 1 with the exception of using these elastic yarns. The results are shown in the following Table 1.

Example 8

Figure 2:
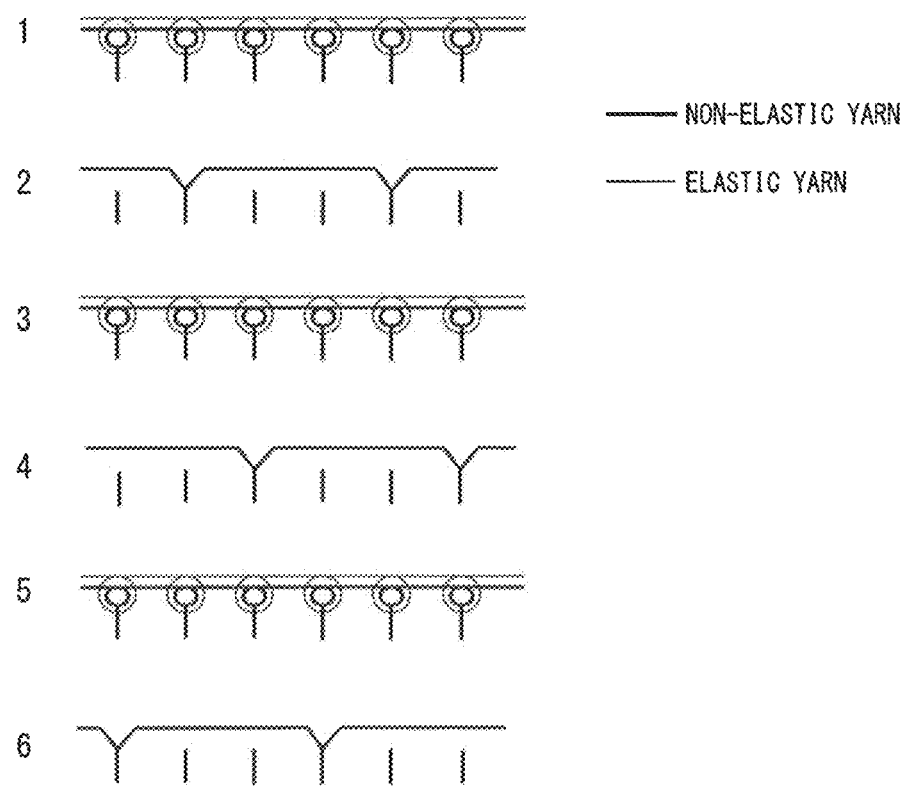
FIG. 2 shows one example of the stitch pattern of an elastic weft knit fabric according to the present invention.
Figure 3:
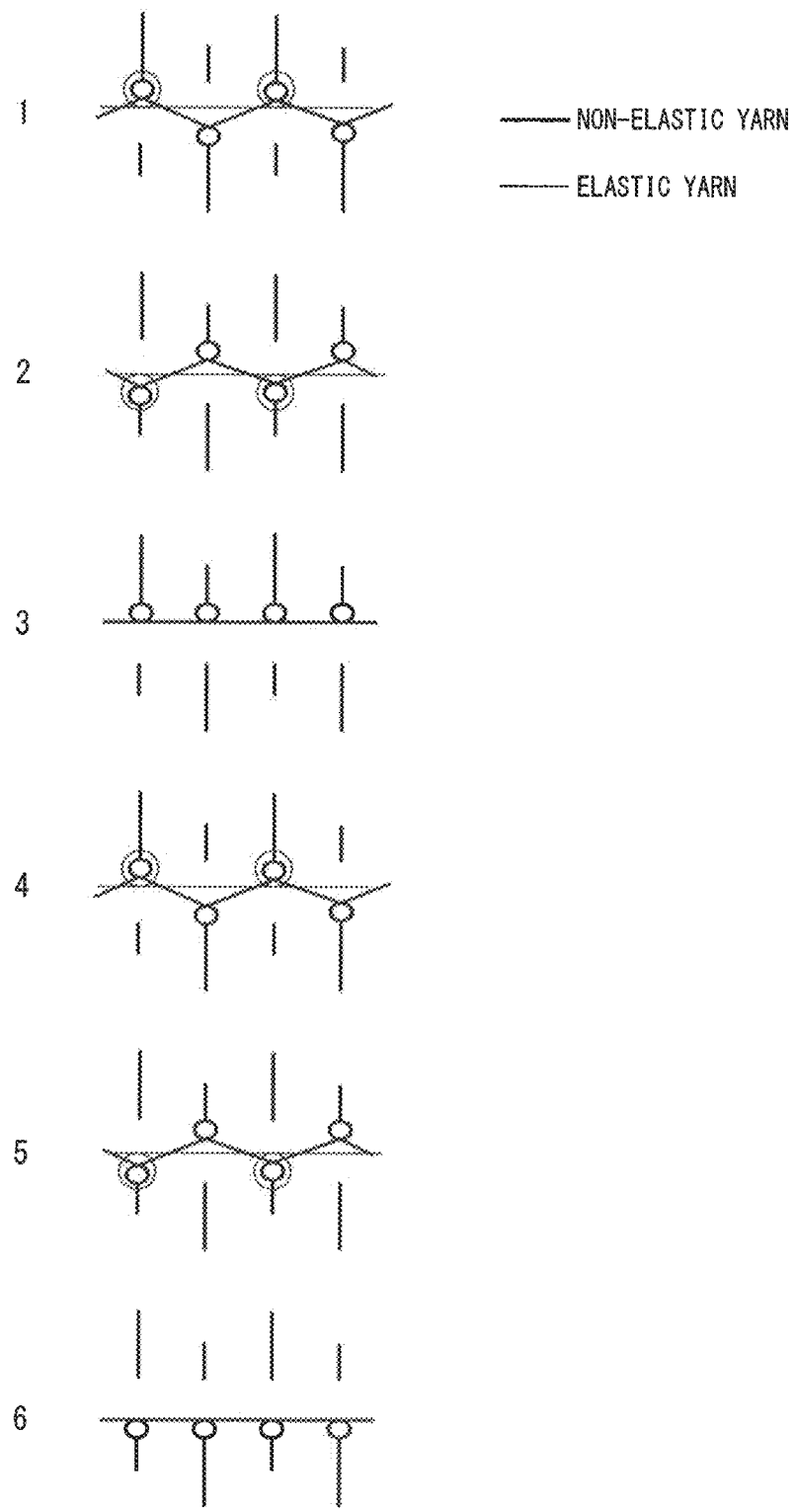
FIG. 3 shows one example of the stitch pattern of an elastic weft knit fabric according to the present invention.

When knitting plain jersey stitches of a plain jersey fabric partially composing inlay stitches as shown in FIG. 2 by using a single knit circular knitting machine having 28 gauge, 33 dtex elastic yarn (trade name: Roica SF, Asahi Kasei Fibers Corp.) and 56 dtex/36 f polyester of 1-heater processing type as a non-elastic yarn were used to knit plain jersey stitches only by employing plating stitch with the elastic yarn under the condition that the stretching ratio between the non-elastic yarn and the elastic yarn is 3.3.

The resulting knitted fabric was subjected to relaxation and scouring treatments with a continuous scouring machine followed by carrying out presetting nearly at the width of the gray fabric for 70 seconds at 195° C., and subsequently carrying out dyeing of the polyester with a jet dyeing machine. After dyeing, a polyester-based hygroscopic fabric softener was imparted, followed by carrying out final setting at a density nearly equal to that for the dyeing treatment for 60 seconds at 170° C. to produce a knitted fabric.

The results of evaluating the performance of the resulting knitted fabric are shown in Table 1, in the knitted fabric of the present invention of Example 8, the instantaneous temperature rise caused by heat generation during stretching was 1.0° C. or more and the knitted fabric was able to be made into a clothing item that facilitates a body movement.

Comparative Example 2

A knitted fabric was subjected to finishing treatments and evaluated under the same conditions as those of Example 8, with the exception of changing the fineness of the elastic yarn and the non-elastic yarn, and changing the presetting conditions to 185° C. and 60 seconds. The results are shown in Table 1.

Example 9

When knitting a stitch of a fabric composing the stitch pattern shown in FIG. 3 using a double knit circular knitting machine having 28 gauge, 44 dtex elastic yarn (trade name: Roica SF, Asahi Kasei Fibers Corp.) and 44 dtex/34 f nylon of 1-heater processing type were used.

The resulting knitted fabric was subjected to relaxation and scouring treatments with a continuous scouring machine followed by carrying out presetting treatment for 90 seconds at 190° C., by adjusting the width and length so that the density of the fabric was nearly equal to that of the gray fabric, and subsequently carrying out dyeing of the nylon with a jet dyeing machine. After dyeing, a polyester-based hygroscopic fabric softener was padded into the knitted fabric followed by carrying out a final setting for 1 minute at 170° C. to produce a knitted fabric.

The results of evaluating the performance of the obtained knitted fabric are shown in Table 1, in the knitted fabric of the present invention of Example 9, the instantaneous temperature rise caused by heat generation during stretching was 1.0° C. or more and the knitted fabric was able to be made into a clothing item that facilitates a body movement.

Example 10

In knitting an interlock stitch of a fabric, using a double knit circular knitting machine having 40 gauge, the whole stitches were knit by employing plating stitch using 33 dtex/36 f polyester of 1-heater processing type as a non-elastic yarn and 22 dtex elastic yarn (trade name: Roica BX, Asahi Kasei Fibers Corp.).

The resulting knitted fabric was subjected to relaxation and scouring treatment with a continuous scouring machine followed by carrying out presetting for 70 seconds at 195° C. at nearly the same width as that of gray fabric, and subsequently carrying out dyeing of the polyester with a jet dyeing machine. After dyeing treatment, a polyester-based hygroscopic fabric softener was imparted to the knitted fabric followed by carrying out final setting for 1 minute at 170° C. at nearly the same density as after dyeing to produce a knitted fabric.

Although the results of evaluating the performance of the knitted fabric are shown in Table 1, in the knitted fabric of the present invention of Example 10, the instantaneous temperature rise caused by heat generation during stretching was 1.0° C. or more and the knitted fabric was able to be made into a clothing item that facilitates a body movement.

Example 11

When producing a plain jersey fabric by employing plating stitch using both a non-elastic yarn and an elastic yarn by a single knit circular knitting machine having 32 gauge, 33 dtex elastic yarn (trade name: Roica SF, Asahi Kasei Fibers Corp.) and 33 dtex/24 f polyester of 1-heater processing type as a non-elastic yarn were used to produce a knitted fabric at a stretching ratio between the non-elastic yarn and the elastic yarn of 3.0.

The resulting knitted fabric was subjected to relaxation and scouring treatment with a continuous scouring machine followed by carrying out presetting nearly at the width of the gray fabric for 90 seconds at 190° C., and subsequently carrying out dyeing of the polyester with a jet dyeing machine. After dyeing treatment, a polyester-based hygroscopic fabric softener was imparted, followed by carrying out final setting at a density nearly equal to that following dyeing for 60 seconds at 170° C. to obtain a knitted fabric.

The results of evaluating the performance of the resulting knitted fabric are shown in Table 1 and, in the knitted fabric of the present invention of Example 11, the instantaneous temperature rise caused by heat generation during stretching was 1.0° C. or more and the knitted fabric was able to be made into a clothing item that facilitates a body movement.

Comparative Example 3

A knitted fabric was produced in the same manner as Example 11, with the exception of using 22 dtex elastic yarn (trade name: Roica SF, Asahi Kasei Fibers Corp.) for the type of elastic yarn, changing the stretching ratio between the elastic yarn and the non-elastic yarn to 2.5, and changing the presetting conditions to 60 seconds at 190° C., followed by evaluating the performance of the resulting knitted fabric. The results are shown in Table 1.

TABLE 1

|  | Fineness of non-elastic yarn during knitting (dtex) | Fineness of elastic yarn during knitting (dtex) | Elastic yarn content (g/m²) | Fineness ratio | (Lb/La) value warp/weft | Stress ratio | Heat generation index | Instantaneous temperature rise caused by heat generation (° C.) |
|---|---|---|---|---|---|---|---|---|
| Ex. 1 | 56 | 44 | 28 | 1.5 | 1.41/1.53 | 0.65 | 78 | 2.3 |
| Ex. 2 | 56 | 44 | 25 | 1.5 | 1.21/1.31 | 0.70 | 87 | 2.2 |
| Ex. 3 | 56 | 56 | 36 | 1.2 | 1.67/1.73 | 0.78 | 89 | 1.8 |
| Ex. 4 | 84 | 44 | 27 | 2.4 | 1.42/1.54 | 0.42 | 50 | 1.6 |
| Ex. 5 | 84 | 44 | 27 | 2.4 | 1.50/1.49 | 0.45 | 51 | 2.4 |
| Ex. 6 | 56 | 44 | 28 | 1.5 | 1.39/1.48 | 0.48 | 55 | 2.9 |
| Ex. 7 | 56 | 44 | 28 | 1.5 | 1.37/1.52 | 0.60 | 68 | 2.7 |
| Ex. 8 | 56 | 33 | 42 | 2.0 | 1.51/1.73 | 0.74 | 33 | 2.1 |
| Ex. 9 | 44 | 44 | 40 | 1.3 | 1.33/1.52 | 0.70 | 101 | 1.9 |
| Ex. 10 | 33 | 22 | 31 | 1.4 | 1.28/1.32 | 0.65 | 65 | 2.5 |
| Ex. 11 | 33 | 33 | 30 | 1.2 | 1.16/1.19 | 0.75 | 109 | 1.2 |
| Comp. Ex. 1 | 84 | 33 | 18 | 3.1 | 1.01/1.11 | 0.38 | 35 | 0.7 |
| Comp. Ex. 2 | 44 | 56 | 62 | 0.9 | 1.87/1.89 | 0.84 | 127 | 0.6 |
| Comp. Ex. 3 | 33 | 22 | 22 | 1.5 | 1.12/1.13 | 0.88 | 136 | 0.5 |

Example 12

A knitted fabric was produced with a half stitch pattern having the open laps indicated below using 56 dtex/36 f polyester a non-elastic yarn for the front reed and 33 dtex elastic yarn (trade name: Roica SF, Asahi Kasei Fibers Corp.) for the back reed using a single tricot knitting machine having 32 gauge.
   Front: 01/32
   Back: 21/01
The resulting knitted fabric was subjected to relaxation and scouring treatment with a continuous scouring machine followed by carrying out presetting nearly at the width of the gray fabric for 90 seconds at 190° C., and subsequently carrying out dyeing of the polyester with a jet dyeing machine. After dyeing treatment, a polyester-based hygroscopic fabric softener was imparted followed by carrying out final setting at a density nearly equal to that following dyeing for 60 seconds at 170° C. to produce a knitted fabric.

The results of evaluating the performance of the resulting knitted fabric are shown in Table 2. In the knitted fabric of the present invention of Example 12, the instantaneous temperature rise caused by heat generation during stretching was 1.0° C. or more and the knitted fabric was able to be made into a clothing item that facilitates a body movement in the case of using as clothing.

Examples 13 to 17 and Comparative Examples 4 and 5

Knitted fabrics were produced and evaluated in the same manner as Example 12, with the exception of producing a knitted fabric in which an elastic yarn content had been reduced by tentering to a coarser density of the content than that in Example 12 (Example 13) or producing the knitted fabrics in which the fineness of the elastic yarn and the non-elastic yarn had been changed (Examples 14 to 17, Comparative Examples 4 and 5). Furthermore, in Comparative Example 4, in addition to the aforementioned changes, the presetting conditions were set to 185° C. and 60 seconds. The results are shown in Table 2.

Example 18

The polyurethane polymer used in Example 4 of Japanese Unexamined Patent Publication No. H7-316922 was prepared, the elastic yarn having different modulus values was produced by adding the polyurethane polymer at 4% by weight to the spinning bath when producing 44 dtex elastic yarn (trade name: Roica CR, Asahi Kasei Fibers Corp.), and a knitted fabric was provided and evaluated in the same manner as Example 3 with the exception of using this elastic yarn. The results are shown in Table 2.

The results of evaluating the performance of the resulting knitted fabric are shown in Table 2. In the knitted fabric of the present invention of Example 18, the instantaneous temperature rise caused by heat generation during stretching was 1.0° C. or more and the knitted fabric was able to be made into a clothing item that facilitates a body movement.

Example 19

A knitted fabric with a half stitch pattern was produced in which the elastic yarn is in a state of an open loop indicated below, using 78 dtex/48 f nylon non-elastic yarn for the front reed and 44 dtex elastic yarn (trade name: Roica CR, Asahi Kasei Fibers Corp.) for the back reed using a single tricot knitting machine having 28 gauge.
   Front: 10/23
   Back: 21/01
The resulting knitted fabric was subjected to relaxation and scouring treatment with a continuous scouring machine followed by carrying out presetting nearly at the width of the gray fabric for 90 seconds at 190° C., and subsequently carrying out dyeing of the nylon with a jet dyeing machine. After the dyeing treatment, a polyester-based hygroscopic fabric softener was imparted followed by carrying out final setting at a density nearly equal to that following dyeing for 60 seconds at 170° C. to produce a knitted fabric.

The results of evaluating the performance of the resulting knitted fabric are shown in Table 2. In the knitted fabric of the present invention of Example 19, the instantaneous temperature rise caused by heat generation during stretching was 1.0° C. or more and the knitted fabric was able to be made into a clothing item that facilitates a body movement.

Example 20

A knitted fabric was produced of the stitch pattern indicated below using 33 dtex/24 f nylon non-elastic yarn for the front reed and the middle reed and 33 dtex elastic yarn (trade name: Roica CR, Asahi Kasei Fibers Corp.) for the back reed using a three-reed single tricot knitting machine having 32 gauge.

Front: 10/23

Middle: 12/10

Back: 21/02

The resulting knitted fabric was subjected to relaxation and scouring treatment with a continuous scouring machine followed by carrying out presetting nearly at the width of the gray fabric for 60 seconds at 195° C., and subsequently carrying out dyeing of the nylon with a jet dyeing machine. After dyeing treatment, a polyester-based hygroscopic fabric softener was imparted followed by carrying out final setting at a density nearly equal to that following dyeing for 60 seconds at 170° C. to produce a knitted fabric.

The results of evaluating the performance of the resulting knitted fabric are shown in Table 2. In the knitted fabric of the present invention of Example 20, the instantaneous temperature rise caused by heat generation during stretching was 1.0° C. or more and the knitted fabric was able to be made into a clothing item that facilitates a body movement.

Example 21

A knitted fabric with a half stitch pattern (indicated below) was produced using 33 dtex/24 f nylon non-elastic yarn for the front reed and 33 dtex elastic yarn (trade name: Roica SF, Asahi Kasei Fibers Corp.) for the back reed using a 36-gauge single tricot knitting machine.

Front: 10/23

Back: 12/10

The resulting knitted fabric was subjected to relaxation and scouring treatment with a continuous scouring machine followed by carrying out presetting nearly at the width of the gray fabric for 90 seconds at 190° C., and subsequently carrying out dyeing of the nylon with a jet dyeing machine. After the dyeing treatment, a polyester-based hygroscopic fabric softener was imparted followed by carrying out final setting at a density nearly equal to that following dyeing for 60 seconds at 170° C. to produce a knitted fabric.

The results of evaluating the performance of the resulting knitted fabric are shown in Table 2. In the knitted fabric of the present invention of Example 21, the instantaneous temperature rise caused by heat generation during stretching was 1.0° C. or more and the knitted fabric was able to be made into a clothing item that facilitates a body movement.

TABLE 2

| | Fineness of non-elastic yarn during knitting (dtex) | Fineness of elastic yarn during knitting (dtex) | Elastic yarn content (g/m$^2$) | Fineness ratio | (Lb/La) value warp/weft | Stress ratio | Heat generation index | Instantaneous temperature rise caused by heat generation (° C.) |
|---|---|---|---|---|---|---|---|---|
| Ex. 12 | 56 | 33 | 41 | 1.9 | 1.55/1.41 | 0.67 | 79 | 2.5 |
| Ex. 13 | 56 | 33 | 36 | 1.9 | 1.32/1.20 | 0.71 | 72 | 2.7 |
| Ex. 14 | 56 | 44 | 55 | 1.4 | 1.53/1.59 | 0.76 | 98 | 1.8 |
| Ex. 15 | 84 | 44 | 52 | 2.3 | 1.42/1.55 | 0.42 | 55 | 1.9 |
| Ex. 16 | 84 | 56 | 58 | 1.8 | 1.20/1.53 | 0.45 | 61 | 2.2 |
| Ex. 17 | 44 | 44 | 57 | 1.2 | 1.51/1.56 | 0.66 | 105 | 2.6 |
| Ex. 18 | 56 | 44 | 55 | 1.4 | 1.51/1.56 | 0.78 | 73 | 3.1 |
| Ex. 19 | 78 | 44 | 48 | 2.1 | 1.59/1.63 | 0.54 | 69 | 3.3 |
| Ex. 20 | 33 | 33 | 36 | 1.2 | 1.45/1.51 | 0.52 | 73 | 2.9 |
| Ex. 21 | 33 | 33 | 31 | 1.2 | 1.22/1.31 | 0.70 | 72 | 2.1 |
| Comp. Ex. 4 | 56 | 56 | 62 | 1.1 | 1.02/1.10 | 0.82 | 128 | 0.6 |
| Comp. Ex. 5 | 22 | 22 | 28 | 1.1 | 1.09/1.12 | 0.38 | 37 | 0.7 |

INDUSTRIAL APPLICABILITY

The elastic knitted fabric of the present invention is a knitted fabric in which the temperature thereof rises instantaneously during stretching when moving the body while wearing as clothing, and can be used as clothing that generates heat when moving the body while wearing and facilitates a body movement when worn if sewn into clothing that covers joints, examples of which include bottoms, such as sportswear in the manner spats, sports tights, compression tights or girdles, or innerwear, tops, such as undershirts, sports shirts or compression shirts, leg wear such as panty hose, socks, tights or leggings, supporters, such as knee supporters, elbow supporters, arm covers, leg covers, knee covers or elbow covers, and gloves.

DESCRIPTION OF THE REFERENCE SYMBOLS

FIGS. 1-3:
1-6 Knitting sequence
FIG. 4:
a Needle loop of non-elastic yarn (length)
b Starting point of needle loop of non-elastic yarn
c Endpoint of needle loop of non-elastic yarn
d Sinker loop of elastic yarn (length)
e Starting point of sinker loop of elastic yarn
f Endpoint of sinker loop of elastic yarn
FIG. 5:
1 Needle loop of non-elastic yarn (length)
2 Starting point of needle loop of non-elastic yarn
3 Endpoint of needle loop of non-elastic yarn
4 Sinker loop of elastic yarn (length)
5 Starting point of sinker loop of elastic yarn
6 Endpoint of sinker loop of elastic yarn

The invention claimed is:

1. An elastic knitted fabric comprising an elastic yarn and a non-elastic yarn, wherein the content of the elastic yarn which is the weight of the elastic yarn per unit fabric area is 20 g/m$^2$ to 36 g/m$^2$, the stress ratio, as determined according to the following equation: Stress ratio=(stress of elastic recovery (N) at 50% elongation)/(stretching stress (N) at 50% elongation) is 0.40 to 0.80, wherein the fabric is stretched to 80% elongation followed by recovering to its original length at the same speed after stretching, stretching and recovery operation is repeated three times, and the stretching stress and the stress of elastic recovery at 50% elongation during the third stretching and recovery at operation are determined, and the instantaneous temperature rise caused by heat generation during stretching and recovering the fabric 100 times at a repeated stretching cycle of 2 times/second, wherein stretching takes place under a load of 9.8 N, is 1.0 or more in at least the warp or weft direction.

2. The knitted fabric according to claim 1, wherein the fineness ratio (fineness ratio=(fineness of non-elastic yarn)/(fineness of elastic yarn)) between the elastic yarn and the non-elastic yarn in a stitch pattern that composes the knitted fabric, is 1.0 to 2.5.

3. The knitted fabric according to claim 1 or 2, wherein the loop ratio (Lb/La) between a length La, obtained by adding the length of a sinker loop of the elastic yarn and the length of a needle loop of the non-elastic yarn in one unit of the stitch pattern when the knitted fabric has been stretched by 30% elongation in both the warp and weft directions, and a length Lb, obtained by adding the length of a sinker loop of the elastic yarn and the length of a needle loop of the non-elastic yarn in one unit of the stitch pattern when the knitted fabric has been further stretched by 50% elongation in either one of the warp and weft directions, satisfies the expression indicated below:

$$1.15 \leq Lb/La \leq 1.75.$$

4. The knitted fabric according to claim 1 or 2, wherein the heat generation index, determined according to the equation: Heat generation index=(elongation (%) under a load of 9.8 N)×(stress ratio), using the elongation under a load of 9.8 N when the knitted fabric is stretched is 40 to 120.

5. The knitted fabric according to claim 1 or 2, which is a weft knit fabric.

6. The weft knit fabric according to claim 5, wherein tuck loops or welt loops are composed of an elastic yarn; or at least either of the knit loops before and after the course which are composed by the tuck loops or welt loops, is composed of an elastic yarn; or tuck loops or welt loops are composed of an elastic yarn and at least either of the knit loops before and after the course which are composed by the tuck loops or welt loops, is composed of an elastic yarn; and the tuck loops or welt loops are contained at 20% to 60% of all the loops in the weft knit fabric.

7. The knitted fabric according to claim 1 or 2, which is a warp knit fabric.

8. The warp knit fabric according to claim 7, wherein the loop ratio (Lb/La) between a length La, obtained by adding the length of a sinker loop of an elastic yarn and the length of a needle loop of a non-elastic yarn in one unit of the stitch pattern when the knitted fabric has been stretched by 30% elongation in both the warp and weft directions, and a length Lb, obtained by adding the length of a sinker loop of the elastic yarn and the length of a needle loop of the non-elastic yarn in one unit of the stitch pattern, when the knitted fabric has been further stretched by 50% elongation in either one of the warp and weft directions, satisfies the expression indicated below:

$$1.15 \leq Lb/La \leq 1.65.$$

9. The warp knit fabric according to claim 7, wherein at least an elastic yarn is knitted with open laps.

10. A clothing item comprising the knitted fabric according to claim 1 or 2 for attaching closely to the body and at least covering a joint.

11. The clothing item according to claim 10, wherein the clothing item is selected from the group consisting of bottoms, tops, leg wear, supporters and gloves.

* * * * *